US007711952B2

(12) United States Patent
Teal et al.

(10) Patent No.: US 7,711,952 B2
(45) Date of Patent: May 4, 2010

(54) METHOD AND SYSTEM FOR LICENSE MANAGEMENT

(75) Inventors: Daniel M. Teal, Austin, TX (US); Richard S. Teal, Media, PA (US); Todd A. Schell, San Antonio, TX (US)

(73) Assignee: Coretrace Corporation, Austin, TX (US)

( * ) Notice: Subject to any disclaimer, the term of this patent is extended or adjusted under 35 U.S.C. 154(b) by 1178 days.

(21) Appl. No.: 11/225,254

(22) Filed: Sep. 13, 2005

(65) Prior Publication Data

US 2006/0064582 A1 Mar. 23, 2006

Related U.S. Application Data

(60) Provisional application No. 60/609,525, filed on Sep. 13, 2004.

(51) Int. Cl.
*H04L 9/00* (2006.01)
*G06F 11/00* (2006.01)
*H04L 9/32* (2006.01)

(52) U.S. Cl. .................. 713/156; 713/155; 713/157; 713/158; 713/165; 713/166; 726/3; 726/4; 726/5; 726/6; 726/7; 726/27; 726/28; 726/29; 726/30

(58) Field of Classification Search .................. 713/156
See application file for complete search history.

(56) References Cited

U.S. PATENT DOCUMENTS

| | | |
|---|---|---|
| 5,005,200 A | 4/1991 | Fischer |
| 5,109,515 A | 4/1992 | Laggis et al. |
| 5,363,446 A | 11/1994 | Ruppertz et al. |
| 5,421,006 A | 5/1995 | Jablon et al. |
| 5,504,814 A | 4/1996 | Miyahara |

(Continued)

FOREIGN PATENT DOCUMENTS

JP 2003150455 5/2003

(Continued)

OTHER PUBLICATIONS

"Intel Buys 6 Percent Stake in California's Phoenix Technologies", San Jose Mercury News, (CA), Business and Industry: BNI, Dec. 21, 1995, ((3 pages).

(Continued)

*Primary Examiner*—Longbit Chai
(74) *Attorney, Agent, or Firm*—Winstead PC

(57) ABSTRACT

System and method are disclosed for securing and managing individual end-user platforms as part of an enterprise network. The method/system of the invention has three main components: a security module, a manager appliance, and a console appliance. The security module enforces the enterprise licenses and security policies for the end-user platforms while the manager appliance provides secure, centralized communication with, and oversight of, the security module. The console appliance allows an administrator to access the manager appliance for purposes of monitoring and changing the licenses. Security is established and maintained through an innovative use of data encryption and authentication procedures. The use of these procedures allows the appliances to be uniquely identified to one another, which in turn provides a way to dynamically create unique identifiers for the security modules. These various components together form an infrastructure over the enterprise network to securely manage the end-user platforms.

26 Claims, 10 Drawing Sheets

U.S. PATENT DOCUMENTS

| | | | |
|---|---|---|---|
| 5,768,126 | A | 6/1998 | Frederick |
| 5,905,860 | A | 5/1999 | Olsen et al. |
| 5,950,221 | A | 9/1999 | Draves et al. |
| 5,958,049 | A | 9/1999 | Mealey et al. |
| 5,961,642 | A | 10/1999 | Lewis |
| 6,047,242 | A | 4/2000 | Benson |
| 6,075,939 | A | 6/2000 | Bunnell et al. |
| 6,148,117 | A | 11/2000 | Lopez et al. |
| 6,189,146 | B1 | 2/2001 | Misra et al. |
| 6,205,492 | B1 | 3/2001 | Shaw et al. |
| 6,212,574 | B1 | 4/2001 | O'Rourke et al. |
| 6,253,322 | B1 | 6/2001 | Susaki et al. |
| 6,275,893 | B1 | 8/2001 | Bonola |
| 6,279,092 | B1 | 8/2001 | Franaszek et al. |
| 6,349,355 | B1 | 2/2002 | Draves et al. |
| 6,351,846 | B1 | 2/2002 | Collin et al. |
| 6,356,937 | B1 | 3/2002 | Montville et al. |
| 6,385,643 | B1 | 5/2002 | Jacobs et al. |
| 6,401,208 | B2 | 6/2002 | Davis et al. |
| 6,405,255 | B1 | 6/2002 | Stoltz et al. |
| 6,412,069 | B1 | 6/2002 | Kavsan |
| 6,460,136 | B1 | 10/2002 | Krohmer et al. |
| 6,463,465 | B1 | 10/2002 | Nieuwejaar |
| 6,480,919 | B2 | 11/2002 | Bonola |
| 6,526,523 | B1 | 2/2003 | Chen et al. |
| 6,532,451 | B1 * | 3/2003 | Schell et al. .................. 705/54 |
| 6,560,706 | B1 | 5/2003 | Carbajal et al. |
| 6,697,876 | B1 | 2/2004 | van der Veen et al. |
| 6,763,517 | B2 | 7/2004 | Hines |
| 6,772,416 | B1 | 8/2004 | White et al. |
| 6,779,110 | B1 | 8/2004 | Aguilar et al. |
| 7,150,035 | B2 | 12/2006 | Makofka et al. |
| 7,150,040 | B2 | 12/2006 | Brownell |
| 7,155,737 | B1 | 12/2006 | Lim et al. |
| 7,155,739 | B2 | 12/2006 | Bari et al. |
| 7,237,123 | B2 * | 6/2007 | LeVine et al. ............... 713/193 |
| 2001/0039614 | A1 | 11/2001 | Hellberg et al. |
| 2002/0004901 | A1 | 1/2002 | Yip et al. |
| 2002/0004905 | A1 | 1/2002 | Davis et al. |
| 2002/0065780 | A1 | 5/2002 | Barritz et al. |
| 2002/0138441 | A1 | 9/2002 | Lopatic |
| 2003/0037237 | A1 | 2/2003 | Abgrall et al. |
| 2003/0110375 | A1 | 6/2003 | Colvin |
| 2003/0120935 | A1 | 6/2003 | Teal et al. |
| 2004/0015962 | A1 | 1/2004 | Carbone et al. |
| 2004/0148505 | A1 | 7/2004 | Qiu |

FOREIGN PATENT DOCUMENTS

| | | |
|---|---|---|
| WO | WO-00/30292 | 5/2000 |
| WO | WO-00/51039 | 8/2000 |
| WO | WO-02/01522 | 1/2002 |

OTHER PUBLICATIONS

"Intel Invites Industry in Design of Technology to Succeed BIOS; Industry Collaboration Key in Addressing Oldest Software Technology in PC Platforms", Predicasts-New Products Announcements: NPA, Jun. 6, 2001, (3 pages).

"System Talks Inc., Agrees to License TouchStone's BIOS Wizard Technology", Predicasts-New Product Announcements: NP1, Jun. 24, 2002, (2 pages).

"VeriSign and Phoenix Technologies Announce Revolutionary Solution For Authentication of PCs and Other BIOS-Enabled Devices; Two-Factor Device Authentication to Enable Secure Remote Access and Trusted Peer-to-Peer Computing", Predicasts-New Product Announcements: NP1, Feb. 20, 2002, (4 pages).

"Viacom Rolls Out Novadigm's Software Management Solution to Over 4,000 Desktops in Eight Weeks", Predicasts-New Product Announcements: NP2, Jun. 14, 1999, (2 pages).

"ECM® 3000 System Overview",. Coretrace, a White Paper, Apr. 27, 2004.

Coretrace, "ECM 3000 System", www.coretrace.com, Product Brochure, Nov. 2004.

Coretrace, "ECM 3000: Series Console", www.coretrace.com, Product Brochure, Feb. 2005.

Coretrace, "ECM 3015: Client Pack", www.coretrace.com, Product Brochure, Nov. 2004.

Coretrace, "ECM 3000: Series Manager", www.coretrace.com, Product Brochure, Feb. 2005.

* cited by examiner

METHOD AND SYSTEM FOR LICENSE MANAGEMENT

RELATED APPLICATIONS

This application for patent claims priority to, and hereby incorporates by reference, U.S. Provisional Application No. 60/609,525, entitled "Method and System for License Management," filed Sep. 13, 2004.

FIELD OF THE INVENTION

The present invention relates to the field of enterprise computing management and, in particular, to a method and system for securely administering the licenses associated with the computers in an enterprise.

BACKGROUND OF THE INVENTION

A typical enterprise (e.g., corporation, university, government agency, etc.) may have anywhere from 15 to 1,500 or more end-user platforms connected to its internal and/or external networks. These end-user platforms (e.g., laptops, desktops, workstations, servers, mobile phones, personal digital assistants (PDA), etc.) typically run one of several available operating systems (e.g., Windows®, Sun Solaris, Linux, etc.) and one or more software applications. For obvious reasons, it is important for the enterprise to ensure that these end-user platforms and the software applications running thereon are configured in a manner that complies with the appropriate licensing requirements.

No licensing system is supportable, however, without a basis in security to prevent unauthorized access to, or modification of, the licenses. Thus, the biggest ongoing challenge for security professionals in enterprise computing management is first to secure the configuration of the end-user platforms, then maintain the security of the configurations. Each end-user platform must be secured in such a way that system user/operators can continue to perform their daily tasks as transparently as possible. Many vendors have attempted to meet this challenge by providing a security "overlay" application that enforces the security on the platform. While this is the right idea conceptually, the implementation, management, and impact on platform operators and security administrators have been less than ideal.

The second biggest challenge is to provide a security solution that can be easily scaled across an enterprise network containing a heterogeneous mix of end-user platforms. While there are some host-based security products that can adequately secure individual platforms, these products do not scale easily or cost-effectively to a large number (e.g., 100, 500, 1,000, etc.) of platforms, as is common in many large enterprises. In order to be a cost effective security solution, a product must be effective at securing individual hosts, must contain a secure infrastructure for communicating with system security administrators, and must be easy to set up and maintain across a large number of end-user platforms.

Accordingly, what is needed is an enterprise computing management solution that overcomes the shortcomings of existing solutions.

SUMMARY OF THE INVENTION

The present invention is directed to a system and method for securing and managing individual end-user platforms as part of an enterprise network. The method/system of the invention has three main components: a security module, a manager appliance, and a console appliance. The security module enforces the enterprise licenses and security policies for the end-user platforms while the manager appliance provides secure, centralized communication with, and oversight of, the security module. The console appliance allows an administrator to access the manager appliance for purposes of monitoring and changing the licenses. Security is established and maintained through an innovative use of data encryption and authentication procedures. The use of these procedures allows the appliances to be uniquely identified to one another, which in turn provides a way to dynamically create unique identifiers for the security modules. These various components together form an infrastructure over the enterprise network to securely manage the end-user platforms.

In general, in one aspect, the invention is directed to a method of establishing a secure environment for an end-user platform, and a system manager able to manage the end-user platform. The method comprises the steps of storing manager authentication information on the system manager, the manager authentication information being unique to the system manager, then generating end-user platform authentication information for the end-user platform using at least a portion of the manager authentication information, the end-user platform authentication information being unique to the end-user platform. The method further comprises the steps of transferring the end-user platform authentication information from the system manager to the end-user platform and establishing a secure connection between the system manager and the end-user platform using the manager authentication information and the end-user platform authentication information.

In general, in another aspect, the invention is directed to a system for managing a plurality of computing platforms. The system comprises a network connecting a plurality of end-user platforms to each other and one or more appliances connected to the network and having appliance authentication information stored thereon that is unique to each appliance. The appliance authentication information for the one or more appliances is derived from a single source of authentication information such that any appliance is capable of authenticating any other appliance.

In general, in still another aspect, the invention is directed to a method for authenticating a plurality of computing platforms. The method comprises the steps of generating platform level authentication information and using the platform level authentication information to generate appliance level authentication information. The appliance level authentication information is unique to each appliance and allows all appliances to authenticate one another. At least a portion of the appliance level authentication information is then used to generate client level authentication information, the client level authentication information being unique to each end-user platform and allowing the appliances to authenticate the end-user platforms.

Additional aspects of the invention will be apparent to those of ordinary skill in the art in view of the following detailed description, made with reference to the drawings, a brief description of which is provided below.

BRIEF DESCRIPTION OF THE DRAWINGS

A better understanding of the invention may be had by reference to the following detailed description when taken in conjunction with the accompanying drawings, wherein.

DETAILED DESCRIPTION OF THE INVENTION

Figure 1:
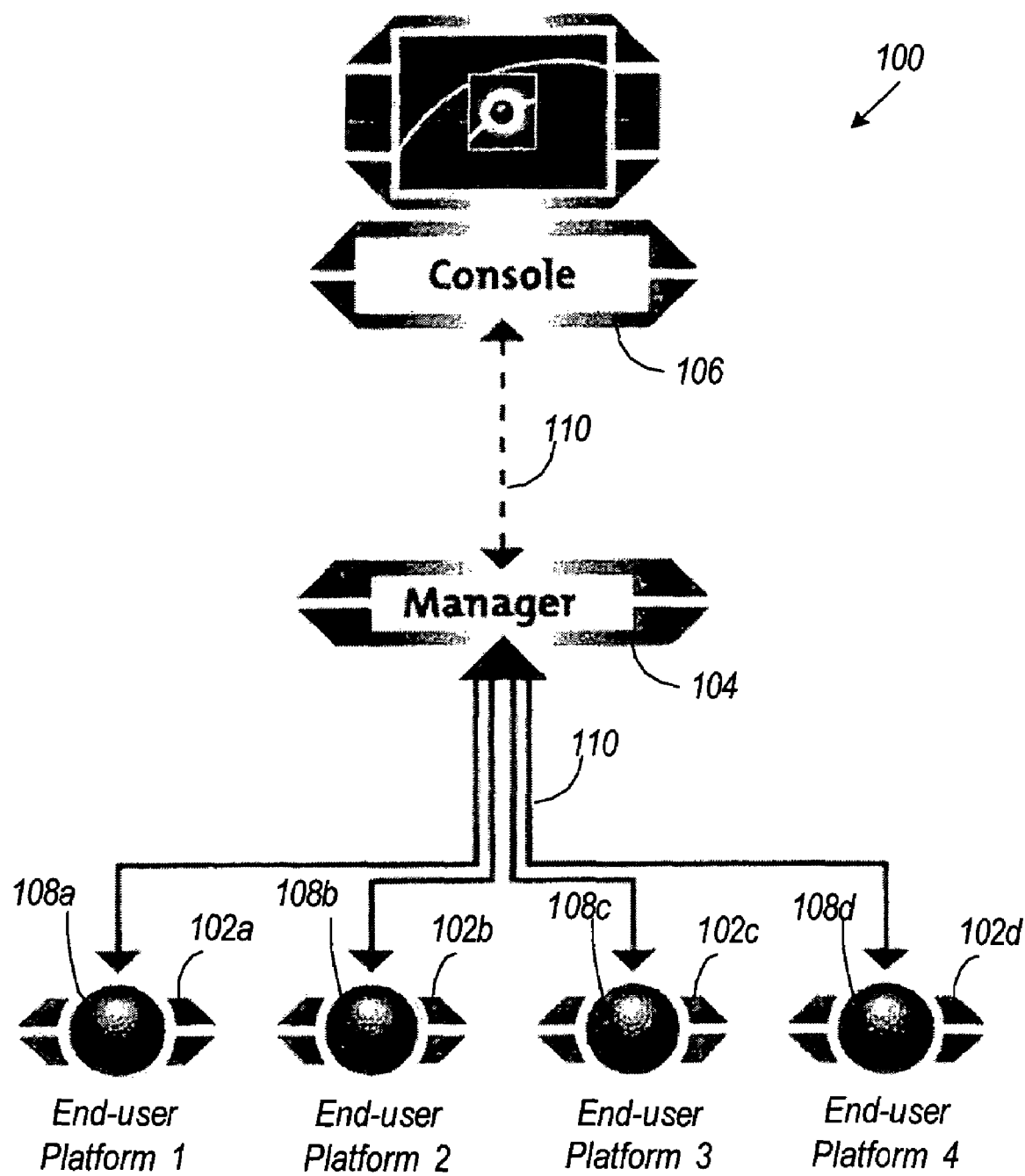
FIG. 1 illustrates an exemplary system for providing enterprise-wide computing management according to embodiments of the invention.

As alluded to above, embodiments of the invention provide a system and method of securing and managing individual end-user platforms as part of an enterprise network. Referring now to FIG. 1, a system 100 for providing enterprise-wide computing management according to embodiments of the invention is shown. The system includes a plurality of computing platforms, including end-user platforms 102a, 102b, 102c, and 102d (hereinafter "end-user platforms 102"), a manager appliance 104 (hereinafter "manager 104") connected to the end-user platforms 102a-d, and a console appliance 106 (hereinafter "console 106") connected to the manager 104. Each end-user platform 102 has a respective security module 108a, 108b, 108c, and 108d (hereinafter "client 108") residing therein that is in constant or almost constant communication with the manager 104 while the end-user platform 102 is connected to the network 110. The network 110 may be any suitable network known to those having ordinary skill in the art, including wired and wireless networks. Briefly, the clients 108 enforce the enterprise licenses and security policies (hereinafter "security policies") for the end-user platforms 102 while the manager 104 monitors the operation of the clients 108 and provides secure, centralized communication to the clients 108. The console 106, which provides the only available access to the manager 104, allows an enterprise administrator to log on to the manager 104 for purposes of monitoring the end-user platforms 102 and implementing policy changes, software upgrades, security event reporting, and the like. From the console 106, an administrator may view all information about the clients 108 as well as issue commands to each client 108 as needed. Following is a more detailed discussion of these various components.

Each client 108 is a software module that, unlike existing solutions, runs in the operating system kernel of the platform 102. This arrangement allows the client 108 to enforce the security policy of the enterprise on each end-user platform 102 independently of any native operating system policies and security mechanisms. Once loaded into the kernel of the operating system, the client 108 is transparent to normal user operation of the platform 102. Because the client 108 is running in the kernel of the operating system, it is able to protect each platform 102 from both local attacks (e.g., via the keyboard) and remote attacks (e.g., across the network). Examples of operating systems for which the client 108 may be loaded into the kernel include Microsoft Windows® 2000, XP, and Server 2003, Sun Solaris® versions 7, 8, and 9, and other suitable operating systems. For more information regarding kernel-based security modules, the reader is referred to, for example, commonly-assigned U.S. patent application Ser. No. 10/294,268, entitled "Kernel-based Network Security Infrastructure," filed Nov. 14, 2002, and incorporated herein by reference.

In a networked environment, the clients 108 are in constant or near constant secure communication with the manager 104. To an external device, such as a network "sniffer," the connection will appear as a standard virtual private network (VPN) connection. These communications are low-bandwidth communications that comprise mainly polling or 'heartbeat' information and system status information. In the event of a network-based attack, or if there is an attempted policy violation by the platform user, the client 108 forwards event messages to the manager 104 for subsequent review by the administrator. If the end-user platform 102 is removed from the network 110, for example, when a laptop is taken home at the end of the day, or if the network connection between the client 108 and manager 104 is disrupted, the client 108 continues to enforce its security policy and simply queues future messages until connection with the manager 104 is restored. Such an arrangement provides a powerful management mechanism that can reach directly into the operating system of an end-user platform 102 to enforce security policies.

The manager 104 has two main purposes: (1) maintain a secure connection with each client, thereby forming a centralized communications hub, and (2) provide a repository for policies, client upgrades, and security event information. To this end, the manager 104 maintains continuous or almost continuous electronic oversight of the system 100 as well as the configuration management of all end-user platforms 102. The manager 104 can issue commands and control changes, collect events, and/or perform complete updates/upgrades of the software running on the end-user platforms 102. As part of the management process, the manager 104 also stores policy configurations, event information, and updates/upgrades for the system 100. Thus, a single manager 104 can easily support the entire licensing and security oversight needs of any typical enterprise.

In a preferred embodiment, the manager 104 is a dedicated hardware appliance that includes a solid-state memory (not expressly shown) for storing the manager operating system and software. It is possible, however, to implement the manager operating system and software on a computer that is not specifically dedicated for the manager function. In any event, the term "manager" (as well as the terms "console" and "appliance") are used herein to refer to both the hardware and software, whether dedicated or not. The manager operating system may be, for example, a Microsoft Windows® XP embedded operating system or Sun Solaris® operating system. Also stored in the solid-state memory are software applications, security policies, and other data needed for maintaining the security of the system 100. Since there are few or no moving parts within the manager 104 associated with any critical components in the preferred embodiment, the manager 104 is essentially a solid-state device. In some embodiments, however, the manager 104 may also (or alternatively) contain a magnetic or optical disk drive for storing the data and/or applications and various other information. Setup, configuration, and operation of the manager 104 are accomplished via network interface (e.g., 10/100/1000 Ethernet interface) in the manager 104 and the console 106, described later herein.

Figure 2:
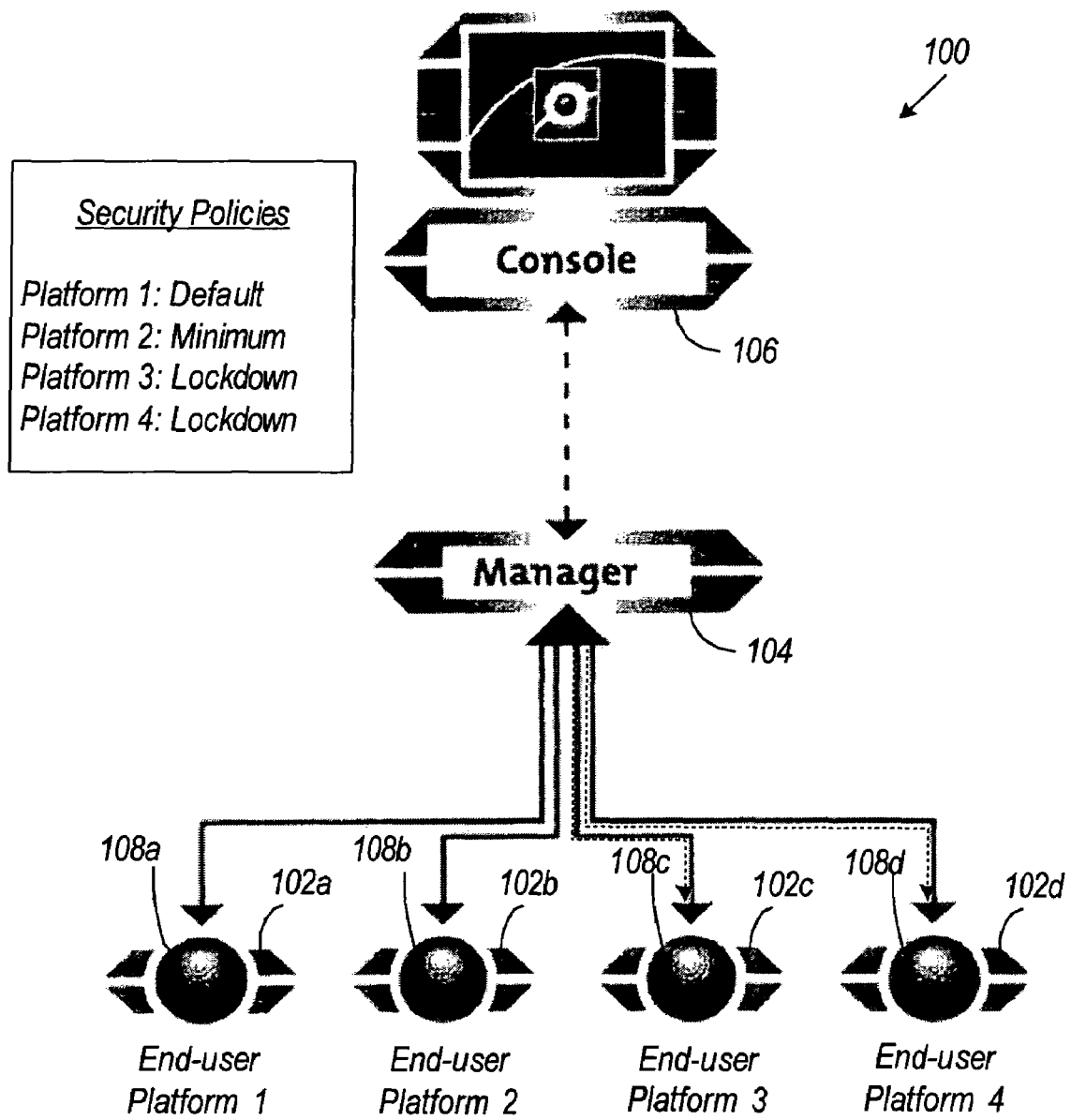
FIG. 2 illustrates an exemplary policy management implementation of the system in FIG. 1 according to embodiments of the invention.

As mentioned above, one of the functions of the manager 104 is to store and manage policy information for the clients 108. The security policy is first created by the system administrator to meet the needs of the enterprise and then is stored under a user-defined file name. This policy may then be applied to all clients 108 with an appropriate command from the administrator via the manager 104. FIG. 2 illustrates the policy management aspect of the manager 104. As can be seen, there are three separate policies that have been established by the administrator and subsequently implemented by the manager 104: Default, Minimum, and Lockdown. The three policies represent varying levels of security, with one policy implemented on each of the end-user platforms 102. When a change or update needs to be made to one of the policies, the administrator simply makes the desired change or update in the appropriate filename using the console 106. The manager 104 thereafter carries out the change or update on the appropriate end-user platforms 102.

Before carrying out the change or update, the manager 104 provides the administrator with two options: (1) apply new policy to existing clients, and (2) store policy under new name. Under the first option, the manager 104 updates the old policy within the manager 104 itself and then proceeds to update all clients 108 that were enforcing the old policy with the new modified policy. This is illustrated by the dotted lines in FIG. 2, showing that the Lockdown policy for the third and fourth end-user platforms 102c and 102d has been updated with the modified policy. Choosing the second option enables the administrator to store the new policy under a different name, for example, "Lockdown 2," for future implementation. The above arrangement provides an easy, flexible, and consistent enterprise-wide implementation of the desired security policies.

Figure 3:
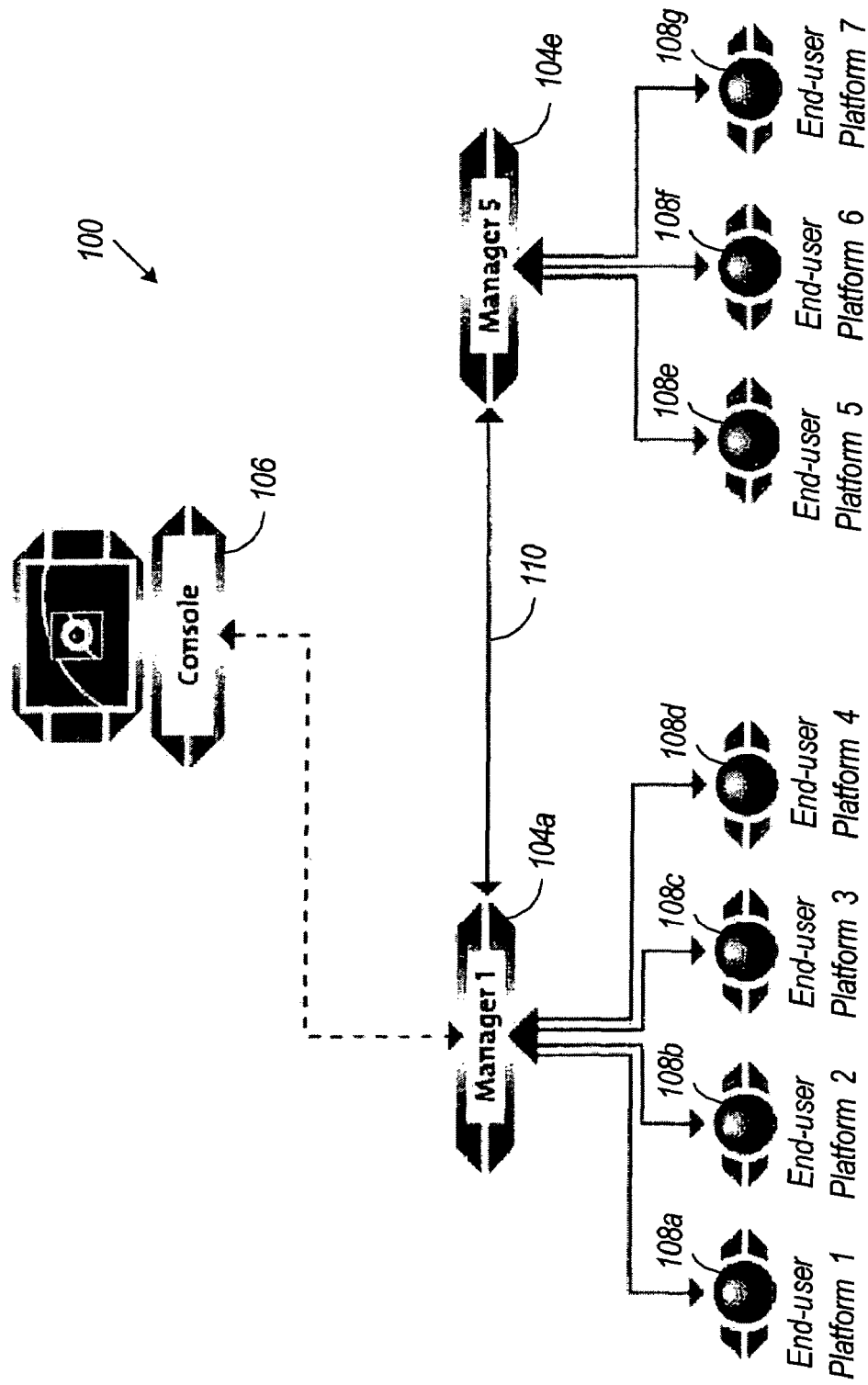
FIG. 3 illustrates an exemplary security group implementation of the system in FIG. 1 according to embodiments of the invention.

A manager 104 may also be configured to communicate with other managers 104, as illustrated in FIG. 3. Here, Manager 1 (104a) and Manager 5 (104e) communicate with each other to share policy, event, and status information across the network. In general, managers 104 and clients 108 that share information in this manner may be referred to as "security groups." A security group may be established by having two or more managers 104 exchange their clients' policy configurations, either during the initial communication between the managers 104 or sometime thereafter, so that each manager 104 contains all the policy configurations from the other managers 104 and vice versa. This type of manager-to-manager relationship is useful when scaling to support large enterprises because a single policy can be modified in one manager 104 and subsequently applied to thousands of clients 108. In addition, an administrator can log into any manager of the security group (via the console 106) and access all components of the system 100, including other managers 104, clients 108, or even other active consoles 106 that are part of the security group.

Figure 4:
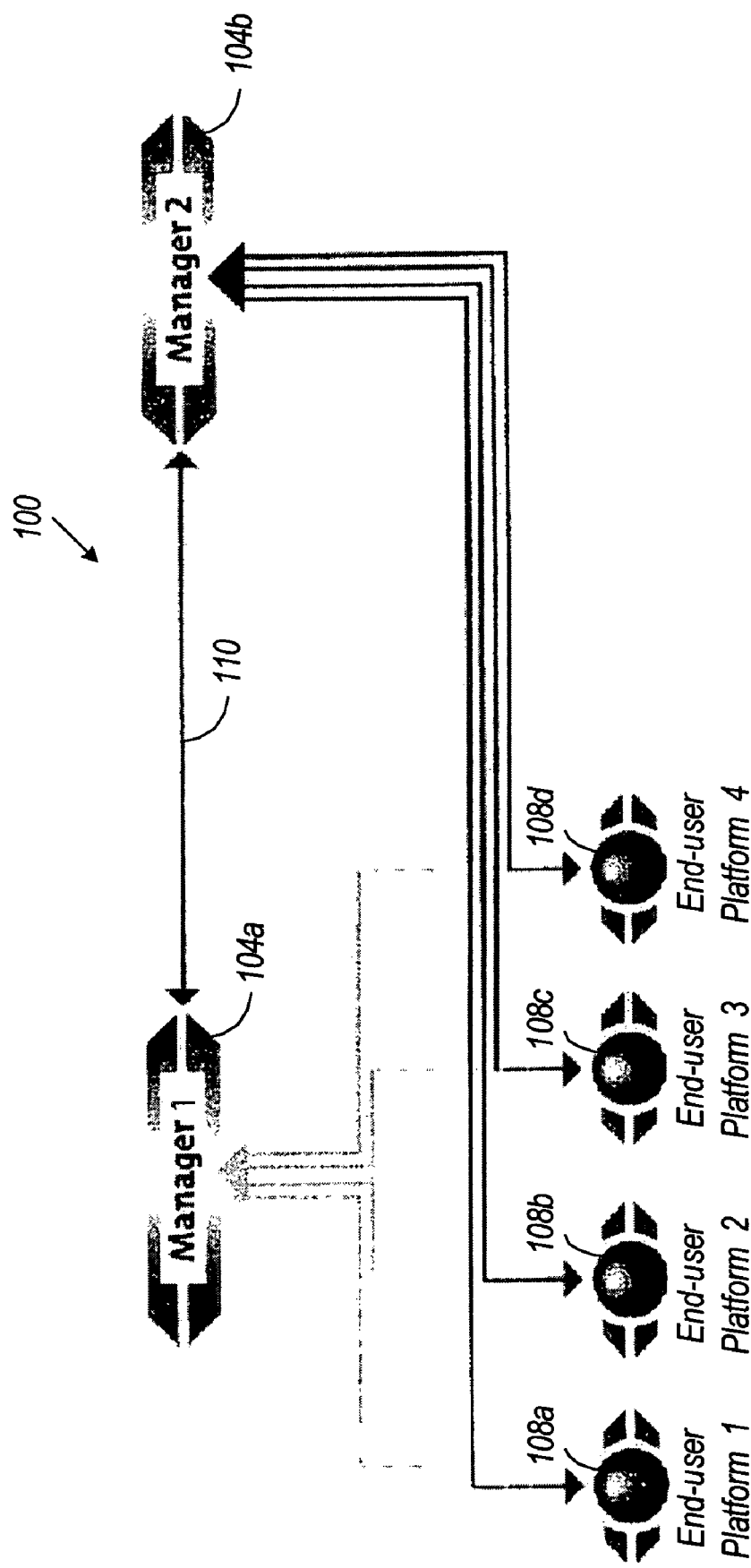
FIG. 4 illustrates an exemplary backup manager implementation of the system in FIG. 1 according to embodiments of the invention.

In some embodiments, a backup or "rollover" manager may be designated in the system 100 to provide additional reliability on an already highly reliable system. This optional arrangement can be used by administrators to compensate for unstable or often changing networks. Depending on the corporate network topology, the clients 108 can be configured to communicate directly with a second manager if communications are lost with their normal or primary manager. FIG. 4 illustrates an exemplary implementation of the rollover manager embodiment of the invention.

In FIG. 4, communication between the clients 108 and their primary manager, Manager 1 (104a) has been lost, as indicated by the broken lines. However, both the clients 108 and Manager 2 (104b) have been pre-configured for this contingency so that the clients 108 automatically switch to Manager 2. Pre-configuration includes, among other things, the system administrator giving the clients 108 the IP address of Manager 2 and giving Manager 2 the authorization to establish secure communications with the clients 108. Thus, when the connection between Manager 1 and the clients 108 is lost, the clients 108 automatically contact the backup manager, Manager 2, and establish a secure connection with Manager 2. If Manager 2 is still in communication with Manager 1, as shown the network connection 110 in FIG. 4, it forwards information about the clients 108 to Manager 1. If no connectivity to Manager 1 remains, then Manager 2 acts as the primary manager for the clients. As soon as the normal network paths are restored, the clients 108 are configured to try and reestablish secure communications with Manager 1.

Because many network topologies can be complex, each manager 104 may include an option to force the clients 108 to contact the backup manager (e.g., Manager 2) as a test of the rollover feature. In this way, security administrators need not wait until a crisis strikes to verify that the system 100 is configured to handle a network disruption. In the event that all communications are lost, the clients 108 are configured to try and contact both the primary and backup managers. The clients 108 also queue event information as needed and continue to enforce their respective security policies, ensuring the security of individual end-user platforms 102.

The third component in the system 100 is the console 106, which is the main administrative interface for the system 100. In a preferred embodiment, the console 106 does not locally store information about the system 100, since all system information is stored on the manager 104. Rather, the console 106 provides login access to the manager 104 from which the data may be retrieved for display. Once logged in, the administrator may view various system parameters and perform configuration management of all system components as needed. Like the manager 104, the console 106 is a dedicated hardware appliance in a preferred embodiment, with the operating system and console software stored on solid-state memory (not expressly shown) for high reliability. The console 106 also includes an optical drive to allow installation of software and product licenses as well as allowing the administrator to create backup CD-ROMs of system configuration data if desired.

Figure 5:
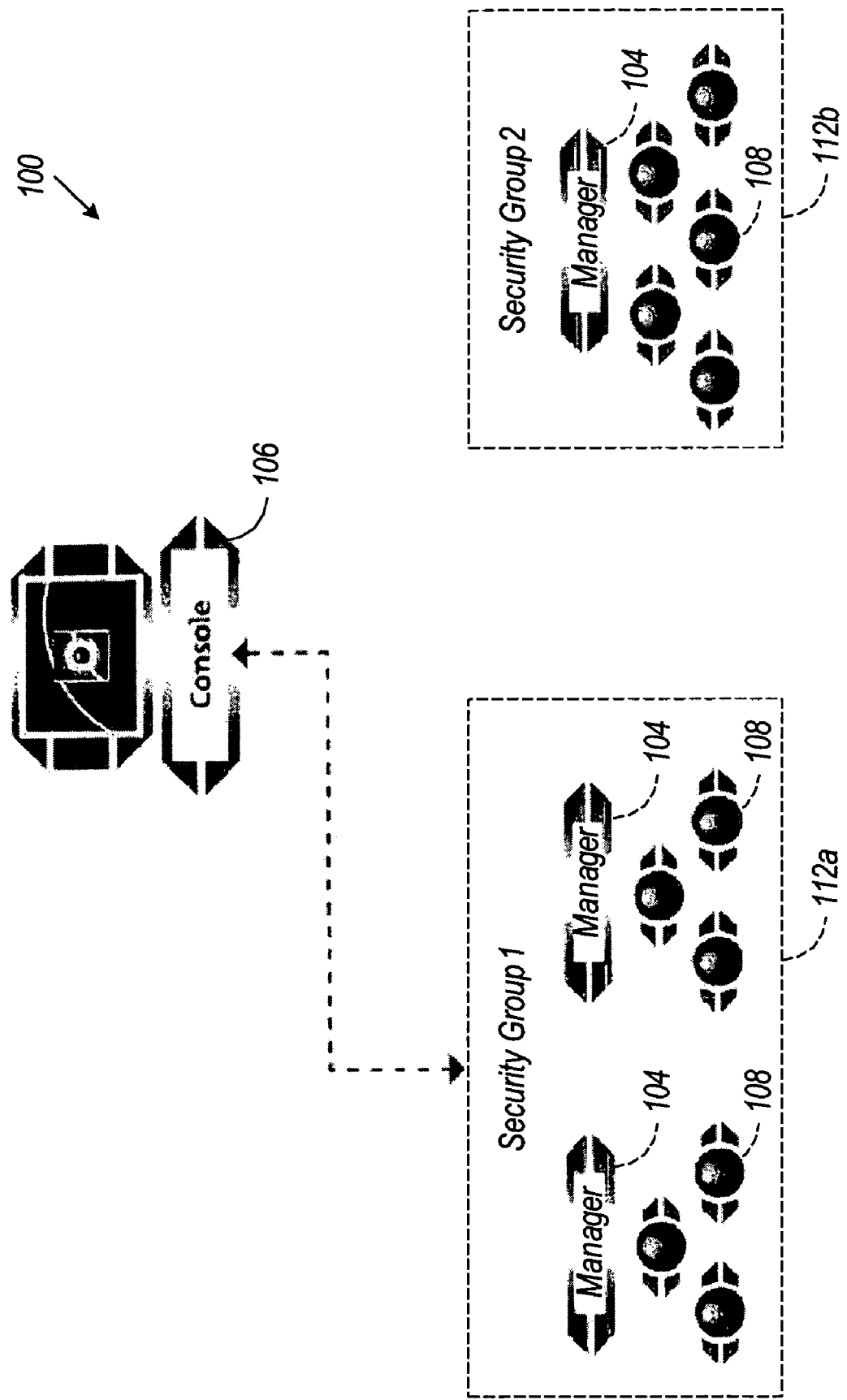
FIG. 5 illustrates an exemplary security group administration implementation of the system in FIG. 1 according to embodiments of the invention.

In one embodiment, in order to be able to log in, an administrator must insert an electronic token, or e-token, into the console 106 (e.g., via a USB port) and enter the proper passphrase in order to access the manager 104. During the login process, the administrator can select from a list of authorized managers 104 based on information stored on the e-token. If the manager 104 is part of a security group and the administrator has the proper access to the group, all the managers 104 and their respective clients 108 may be visible and accessible from the single login. The administration of a security group via the console 106 is illustrated in FIG. 5.

As can be seen, there are two security groups in this example: security group 1 (112a) having two managers 104 managing six clients 108, and security group 2 (112b) having one manager 104 managing five clients 108. Once an administrator (e.g., Administrator A) has successfully logged into one of the managers 104 of security group 1 by inserting the e-token into the console 106 and entering the appropriate passphrase, the administrator can view and interact with all components of that security group, but not of security group 2. After the administrator has logged off, another administrator (e.g., Administrator B) can plug in his/her e-token and log into the manager 104 within security group 2. From this login, the second administrator can view and interact with all the components that are part of this security group, but not of security group 1. This architecture allows different administrators, with different e-tokens, to use the same console to log into different security groups without compromising the security of the system. This architecture also allows flexibility in creating security groups, assigning administrators, and using the e-tokens.

Viewing of the components of a security group is accomplished via a graphical user interface in the console 106, which is also typically provided with a high resolution LCD display and video driver that has been optimized for the graphical user interface. Using various graphical control mechanisms, the administrator can see and sort through all the managers 104, clients 108, and even other consoles 106. Selecting a client 108 reveals many types of information, including connectivity status, active policy, and configuration history. Similar types of information may also be displayed for a manager 104 if selected. Certain data fields (e.g., security policy names) may be directly edited, but attempting to edit other data fields prompts a data entry-like "wizard" by the console 106. For example, changing the IP address of a manager interface can potentially affect many clients 108, so the console 106 leads the administrator through the process to ensure the system 100 continues functioning properly. The console 106 may also contain embedded electronic help documentation, with cross-links in some cases to allow an administrator to quickly access important information. When available, the console 106 can also securely access support servers for downloading upgrades for the console software.

To effectively enforce the enterprise security policies for the end-user platforms 102, the client 108 uses a number of distinct policy mechanisms, including (1) file/directory restrictions, (2) file/directory visibility, (3) file integrity, and (4) packet filtering. Each mechanism is independent of any operating system security features or any third party security software already installed on a platform 102. Also, because the client 108 is running in the kernel of the operating system, the policy mechanisms override any other policy that may be present. Following is a discussion of these policy mechanisms.

The file/directory restriction mechanism restricts access to certain files and directories in a manner similar to that currently available in many operating systems. However, instead of being set by, for example, a Solaris® root level or Windows® administrator level privilege, these files and directories are only accessible to the client 108. The client 108 can then enforce read, write, or execute attributes, in any combination, and on any file, as set by a properly authorized administrator via the console 106. These attributes may then be modified by the administrator as needed and implemented as part of the security policy.

The file/directory visibility mechanism allows the administrator to effectively hide a file or directory. Once hidden, the file or directory cannot be read from, written to, or executed by any means. The only way to access the file or directory again is via an appropriate command (e.g., unhide) from the client 108 (via the console 106).

The file integrity mechanism employs the well known security concept of a message digest or "hash." The message digest or hashing program reads in a variable length file and creates a fixed length output number called a digest or hash. The programs are specialized so that changing even one bit in the file creates a hash that is completely unrelated to the original file. By selecting certain files on which to enforce integrity checks (via the console 106), the administrator can instruct the client 108 to create a hash for each of the selected files and store them in a secure location. Depending on the type of file that is being protected and how it is accessed, the client 108 subsequently rehashes the file and compares the new value to the stored value. For example, if the file winword.exe, a Microsoft Word file, is selected for integrity checks, it is only rehashed and tested when the Microsoft Word is started. If the hash values match, the file has not been altered. Otherwise, the client 108 notifies the administrator (via the console 106).

The packet filtering mechanism allows the client 108 to monitor inbound and outbound transmission packets. The administrator may select, via the console 106, a number of options regarding the packet filtering mechanism, for example, the direction of the packets to monitor, the desired result, interface, protocol, IP addresses, source, and destination ports to build the packet filter policy statement. There may be multiple packet filter policies for a given client 108, with each policy varying in complexity from the next. In a preferred embodiment, the client 108 enforces the packet filter where the packets come off the network interface card for inbound traffic and where the packets come off the operating system stack for outbound traffic, since these are the optimum points for protecting the platform from a network-based attack or for preventing a user from unauthorized activity across the network.

These same four mechanisms may also be used internally by the client 108 itself where the client 108 has certain embedded policies that are not to be accessed by the administrator. For example, the client 108 may be hidden on the platform 102 using the hide directory policy. Various files and kernel software modules may be identified for file integrity checks to ensure the security software itself is not compromised. There may also be embedded packet filters to look for malformed and other suspicious IP packets. In addition to the client 108, the manager 104 and console 106 may also use these security mechanisms to secure the platform 102.

Installation of the client 108, manager 104, and console 106 may be accomplished via simple "plug and play" installation so that the actions required by the administrator are both intuitive and straightforward, with any system setup complexity handled by the software for each component. The first step in setting up a new system is to configure the manager 104 and console 106, both of which must initially be connected to the same subnet of the network 110 (e.g., via an Ethernet cable to the local subnet). After turning on the manager 104, the administrator must insert the e-token, which is provided with the manager 104, into the USB port on the console 106. This e-token contains a digital certificate that allows secure and authenticated communication with the manager 104. The console 106 thereafter prompts the administrator to select a manager from the menu (there can be up to 20 managers identified on each e-token) and to enter an initial passphrase to be used for authentication. It is of course possible to require the administrator to simply insert the e-token without entering the passphrase, or vice versa, in order to access the manager 104. In any event, once the administrator has selected a manager 104 for the client 108, all additional potential managers 104 naturally drop that client 108 from their consideration queue.

As the administrator is going through the above of setup process, the manager 104 and console 106 establish an initial secure connection with each other. The manager 104 periodically broadcasts special IP packets onto the network 110 that are picked up by the console 106. These packets provide information about the manager 104 that the console 106 eventually uses to open a secure connection. Once the administrator has selected the manager 104 and passphrase, the console 106 contact the managers 104 (it knows the manager 104 is on the network 110 from the special packets), establishes an encrypted link, and authenticates the manager 100 for via digital certificates, discussed later herein. The relationship between the console 106 and the manager 104 can be authenticated because the e-token is pre-loaded with the digital certificate for the manager 104. At no time during this process, which conforms to IPSec standard, is sensitive information exchanged that is not encrypted.

The reason the manager 104 and console 106 must be set up on the same subnet initially is to set the IP addresses of the two appliances. Once the administrator has successfully logged into the manager 104, he/she can set these IP addresses. The console 106 and manager 104 can subsequently be relocated to different parts of the network 110 within the enterprise as desired, the IP addresses reset, and they will reestablish communication with each other as long as there is an open network path between the two components.

As for the client 108, this installation process begins with an install program, referred to herein simple as "the client install program." This small program, which may be copied from a file server, transferred via FTP (File Transfer Protocol), ghost imaged, or even "pushed" from the manager 104 itself, must be loaded on every potential end-user platform 102 and executed with the appropriate privileges (e.g., administrator privileges for Windows® administrator, root privileges for Solaris®. The client install program thereafter collects information about the potential client, looks for manager identification packets on the network, and sends the information to all managers 104 that it is able to locate, a process which will be described in more detail later herein. As before, the information is encrypted and authenticated before transmission.

Once the information is received by the manager 104, it is stored in a queue awaiting review by the administrator. Based on the provided system information, such as IP address, operating system, system name, and so forth, the administrator can decide whether or not to install the client 108 and license it to the new platform 102. Depending on what licenses were purchased, the manager 104 may contain a fixed number of preinstalled server or desktop license packs for the client 108. If the administrator chooses to do an install, one of the licenses for the client 108 is issued and the client 108 is downloaded to the chosen platform 102. At the time of initial install, the administrator must also choose a security policy for the client 108 to enforce. This can be either a custom policy built by the administrator, or a default policy developed by a third party.

As mentioned above, the system 100 uses an encryption and authentication procedure to secure all communications within the infrastructure. The two major cryptographic technologies used in the system 100 are digital certificates and data transmission encryption. The system 100 makes use of the digital certificates and data transmission encryption technologies in a manner that complies with IPSec, which specifies the standards for authentication, encryption and hashing of files. These technologies are well known to those having ordinary skill in the art and will not be described in detail here. It is sufficient to simply say that, in a preferred embodiment, the system 100 uses the RSA public key algorithm for authentication and digital signatures, the Triple Data Encryption Standard algorithm (3-DES) for encryption, and the Standard Hash Algorithm algorithm, SHA-1, for hashing of files, which produces a 160-bit hash. For the RSA algorithm, preferably 2048 and 1024-bit keys are used, but smaller or larger keys may also be used without departing from the scope of the invention. In addition, the system 100 uses the Diffie-Hellman algorithm, which allows two unverified parties to generate and exchange a shared secret key, establish an encrypted link, and exchange messages.

Authentication and integrity checking in the system 100 relies on the use of digital certificates to exchange encoded authentication information. Such digital certificates are frequently used to distribute public encryption keys ensure the identify the issuer of the These certificates may be encoded, for example, using the standard Abstract Syntax Notation (ASN.1), and the keys and hashes used for encoding the digital certificates may be generated using the RSA and SHA-1 algorithms, respectively. The digital certificates themselves are then assembled in the format specified by, for example, the X.509 standard, version 3. The X.509 standard is entitled "Certificates and Certificate Revocation Lists" and is an ITU (International Telecommunication Union) and ISO (International Standards Organization) standard. This standard provides an exemplary format for the basic, pre-defined fields and extensions used in digital certificates, although other standards may certainly be used without departing from the scope of the invention. The X.509 standard data fields include the version of the certificate, certificate serial number, signature algorithm identifier, issuer, validity period, subject, subject public key, issuer unique identifier, subject unique identifier, and extensions. The subject in this case is the owner of the public key published in the certificate and the issuer is the organization or application that assembled and signed the certificate. The certificate may also contain additional information about the subject and issuer.

The system 100 creates and uses many different types of digital certificates. Although each is unique, they can be grouped based upon their use as shown in Table 1 below.

TABLE 1

| Group | Certificate |
| --- | --- |
| System | Manager Certificate, Appliance Generation Certificate, Console Certificate, Client Certificate, Install Certificate |
| License | Product Certificate, Vendor Generation Certificate, Vendor Certificate, License Certificate, Maintenance Certificate |
| Other | Root Certificate, Administrator Generation Certificate, Administrator Certificate |

The first group of digital certificates contains system information. Each of these digital certificates contains data fields that uniquely identify the client 108, manager 104, or console 106. These digital certificates are used to mutually authenticate the client 108 and manager 104 in the manner discussed earlier. The second group of digital certificates contains information used for software license management. The combination of these two groups of digital certificates determines what software the customer is authorized to load, run, and upgrade. The system 100 may also use the digital certificates to manage the licenses for the system's own software, and can extend this licensing mechanism to license third party applications to run over the system 100. Finally, the administrator and root digital certificates contain information used for granting an administrator access to the system 100. A detailed description of these certificates and their uses are provided in the following discussion.

With respect to the Platform certificates, it should first be noted that the modular nature of IPSec allows for many forms of authentication. Thus, although embodiments of the invention use digital certificates because of their security, strength and flexibility, other forms of authentication information may certainly be used without departing from the scope of the invention. The Platform certificates in particular are used to mutually authenticate various components (e.g., manager 104, console 106, and client 108) of the infrastructure in the system 100. These digital certificates (as well as the License and Other digital certificates) are defined in terms of the number of levels removed from a Root Certificate, which is the highest level (level 1) digital certificate used in the system 100. The digital certificates for each level are then digitally signed using a private key affiliated with the next higher level digital certificate in the system hierarchy, as illustrated in FIG. 6.

Figure 6:
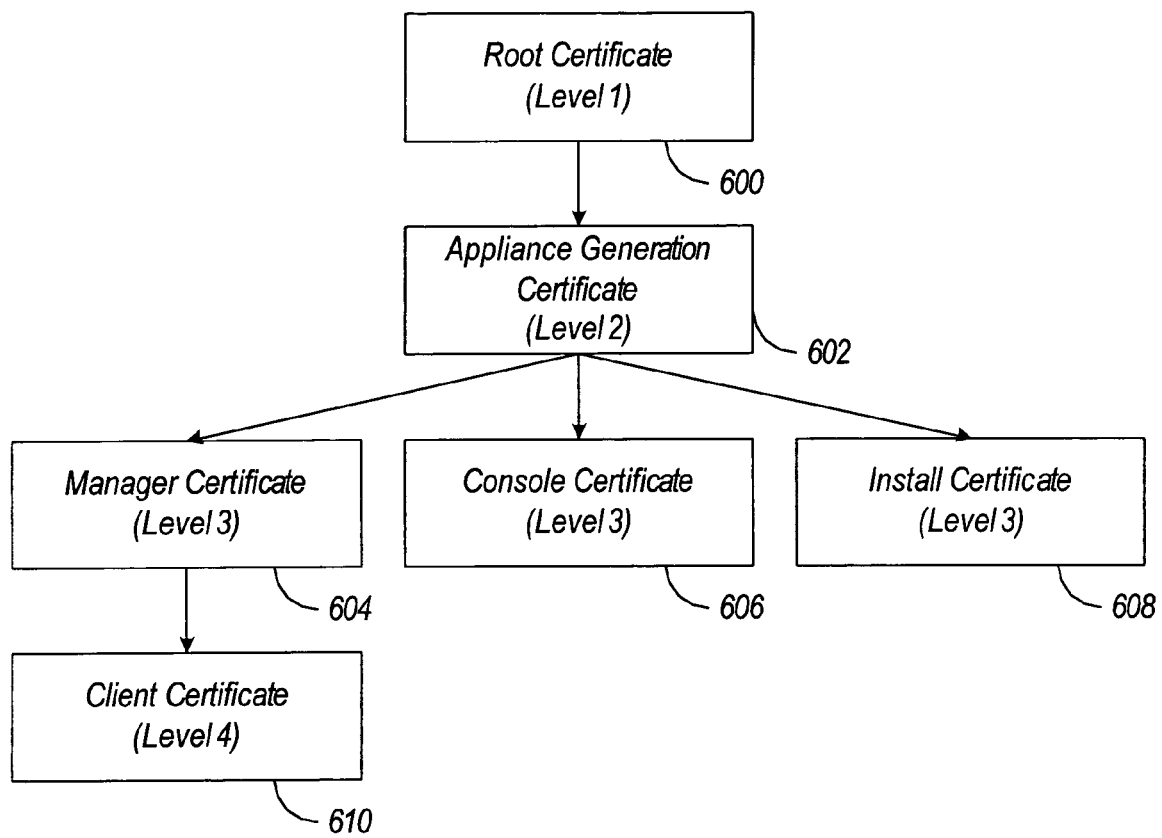
FIG. 6 illustrates an exemplary hierarchy for a platform certificates group according to embodiments of the invention.

As can be seen in FIG. 6, level 1 is occupied by the Root Certificate 600, the private key from which is used to sign the Appliance Generation Certificate 602, a level 2 certificate. The private key from the Appliance Generation Certificate 602 is then used to sign the level 3 certificates, namely, the Manager Certificate 604, the Consoles Certificate 606, and the Install Certificate 608. The private key from the Manager Certificate 604 is then used to sign the Client Certificate 610, which is a level 4 certificate.

To build the Manager Certificate, several system parameters are collected after the manager 104 software is installed on the manager 104 hardware. For managers 104 running the Microsoft Windows® embedded XP operating system, for example, the Windows system ID (SID), Windows OS build, and microprocessor serial number are collected. These parameters together uniquely identify the manager 104 and are difficult to change without major system rebuilding. This information is then embedded in the Manager Certificate and stored on the manager 104. An example of some of the data fields along with sample data for the Manager Certificate 604 is shown in Table 2.

TABLE 2

| Field | Data |
|---|---|
| Serial Number | A47FA35E-53E696D7-09C9F455-10694156 |
| Common Name | ECM Security Appliance |
| Description | Platform Type: Manager |
| Description | Windows Platform SID: S-1-5-21-1993962763-789336058-1060284298 |
| Description | Windows Operating System Build Number: 2600 |
| Description | Processor Serial Number: 123456789 |

In Table 2, the first column contains the names of data fields and the second column contains the data for each field. The data for the Serial Number field, for example, is the UUID (Universal Unique Identifier) of the manager 104, the data for the Common Name field is the name of the product, and the unique manager parameters are used for each of the desired Description fields. The RSA algorithm is used to produce a public/private key pair that will only be employed by this manager 104. The public key is then inserted into the Manager Certificate 604 and the private key is stored in a secure location on the manager 104. Finally, the entire Manager Certificate 604 is digitally signed with a private key associated with the level 2 certificate, namely the Appliance Generation Certificate 602, and stored on the manager 104 along with the Root Certificate 600 and the Appliance Generation Certificate 602. The manager 104 may then issue its Manager Certificate 604 whenever it needs to authenticate itself to another system 100 component.

As can be seen from the foregoing, the authentication process relies on the integrity of a series of public keys, one from each level of the certificate tree. In addition to each manager 104 having its own public/private key pair, it also contains the public keys from the Root Certificate 600 and the Appliance Generation Certificate 602 as part of its keychain. Because the same level 2 private key is used to sign all level 3 Platform certificates, the level 2 public key from the Appliance Generation Certificate 602 may be used to verify the digital signature of another level 3 certificate, for example, the certificate for any other manager 104. Once the digital signature is verified, the receiver is assured that the information in the level 3 certificate has not been altered. The receiver is also assured that the level 3 certificate truly came from the identified sender, in this case, another manager 104, a console 106, or a Client Setup program (discussed later herein), because only the level 2 private key could have been used to sign the certificates (e.g., during the manufacturing of the components).

The Console Certificate 606 is similar to the Manager Certificate 604 except that its platform type is "Console." It is signed by the same level 2 private key (e.g., during manufacture) and contains the corresponding level 2 public key as well.

The Client Certificate 608 is somewhat similar in structure to the certificates of the manager 104 and console 106, but different in origin. Before discussing this certificate, it is instructive to understand how the client 108 software is installed. The client 108 is a piece of software loaded on an end-user platform 102 (e.g., a laptop, desktop, server, mobile terminal, etc.). The loading of this software is done from the manager 104, but first the manager 104 needs to obtain several parameters from the target end-user platform 102. To facilitate this process, embodiments of the invention use a software application called a Client Setup program. This application should be loaded by the enterprise system administrator using any suitable technique, for example, ghost images, copying across the network from a shared file server, or copying the Client Setup program machine-by-machine from a CD-ROM. Regardless of the installation technique, the Client Setup program should be run with the appropriate level of privilege, for example, root privileges on a Solaris® platform or administrator privileges on a Windows® platform.

The Client Setup program is designed to collect certain types of information from the target end-user platform 102, establish an initial secure session with the manager 104 (e.g., via IPSec), and assist in the installation of the actual client 108 software. The types of information collected from the target end-user platform 102 include, for example, the Windows SID and the Windows OS build for Microsoft-based systems and the Host ID and Solaris version for Solaris-based systems. Once this information is gathered, the Client Setup program attempts to establish communications with the manager 104. If the client 108 is on the same subnet as the manager 104, it automatically discovers the manager 104. If the manager 104 is located beyond the local subnet, the IP address of the manager 104 must be provided to the Client Setup program (e.g., by the administrator). This IP address can be provided with the copy of the Client Setup program, that is, with the ghost image or file server copy, or it can be entered interactively from the client 108 itself.

After initial communication is established, the Client Setup program (via the target end-user platform 102) and the manager 104 establish a secure link with each other (e.g., via IPSec). Thereafter, authentication from the Client Setup program to the manager 104 is accomplished using the Install Certificate 608. This certificate is included with the Client Setup program and contains information about the Client Setup program, but more importantly, is signed by the same level 2 private key used to generate the certificates for the Client Setup program and the manager 104. When the Client Setup program passes the Install Certificate to the manager 104, the manager 104 can use the public key from its Appliance Generation Certificate 602 to authenticate the Client Setup program. Once authenticated, the Client Setup program sends the end-user platform 102 specific information it has collected across the secure link to the manager 104. This information is then queued for review by an enterprise administrator for approval.

Upon approval of the enterprise administrator, the manager 104 begins installing the client 108 software. In a preferred embodiment, the manager 104 first checks with the License Certificate (described later herein) stored on the manager 104 to make sure that there are proper client licenses available of the given type (e.g., laptops, desktops, servers, etc.). Next, the manager 104 takes the end-user platform specific information passed by the Client Setup program and generates the Client Certificate 610. Unlike the manager 104, console 106, and Client Setup program that have their digital certificates generated by a common source (e.g., the manufacturer), the Client Certificate 610 is dynamically generated by the manager 104. This digital certificate looks very similar to those used by the manager 104 and console 106, except that the data fields describe the end-user platform 102 as a desktop or server, Sun or Windows platform, and so forth. Samples of the data fields used in the Client Certificate 610 for a Solaris server are shown in Table 3.

TABLE 3

| Fields | Data |
| --- | --- |
| Serial Number | BCB45690-5C47B890-DF436713-BDB5F5B6 |
| Common Name | ECM ® Platform Client |
| Description | Platform Type: Server |
| Description | Solaris Version: 5.9 |
| Description | Solaris HostID: 830c3b8b |

For the Serial Number, the manager 104 uses the UUID that uniquely identifies the target end-user platform 102. The Common Name and Description fields are also filled in with the appropriate information. The manager 104 then generates a level 4 public/private key pair for the new client 108 and embeds the public key in the Client Certificate 610. The manager 104 then hashes the Client Certificate 610, encrypts the hash with its level 3 private key, and digitally signs the certificate by appending the encrypted hash. This level 4 certificate may now be used by the new client 108 for all future authentication of the new client 108.

As a final step, the manager 104 pushes the entire client 108 software, along with the Manager Certificate 604, the Client Certificate 610, the Root Certificate 600, and the Platform Generation Certificate 602, across the secure link to the target end-user platform 102. Once the transfer is complete, the Client Setup program shuts itself down on the target end-user platform 102 where it has been running, and the client 108 software starts up in the kernel of the operating system. The client 108 may thereafter establish a new secure connection (e.g., via IPSec) with the manager 104 using the Manager Certificate 604 and Client Certificate 610 to thereby become an active component of the system 100.

Figure 7A:
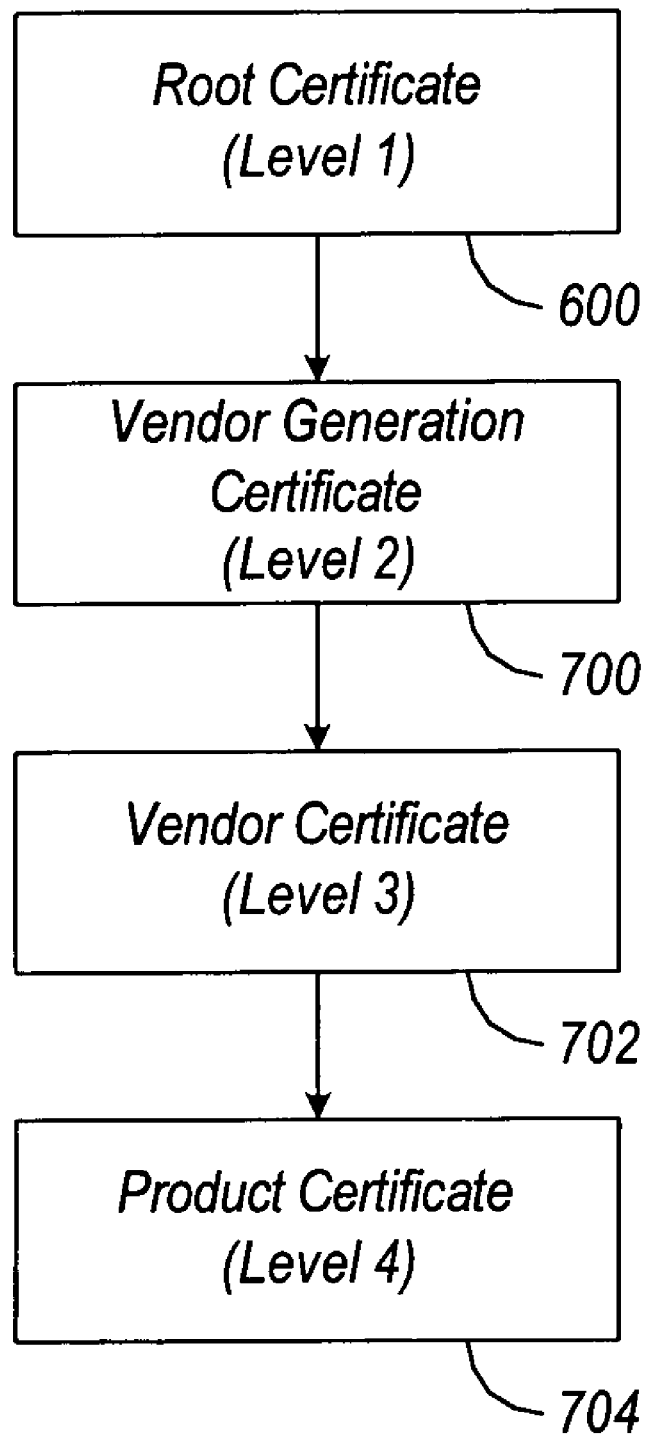
FIGS. 7A-7C illustrate exemplary hierarchies for license certificates groups according to embodiments of the invention.

In addition to the Platform certificates that are used to establish secure communication within the system 100, the system 100 also uses License certificates to secure the software applications that are being run on the system 100. The License certificates are used to: (1) ensure non-compromised software is running on the end-user platforms 102, (2) ensure the software is properly licensed/purchased, and (3) provide a mechanism for software maintenance enforcement. To ensure non-compromised software is running on the end-user platforms 102, embodiments of the invention provide a Product Certificate. To ensure software is properly licensed/purchased, embodiments of the invention provide a License Certificate. To provide a mechanism for software maintenance enforcement, embodiments of the invention provide a Maintenance Certificate. And to ensure future extensibility to third-party developers, embodiments of the invention also provide software licensing over the secure connection established using the Platform certificates to third parties. Indeed, the software used by the various components of the system 100 may be licensed using this same mechanism. These various License certificates are illustrated with respect to FIGS. 7A-7C.

As can be seen in FIG. 7A, certificates are again defined in terms of the number of levels removed from the Root Certificate. Thus, at the highest level is the Root Certificate 600, the private key from which is used to sign a Vendor Generation Certificate 700 (a level 2 certificate). The Vendor Generation Certificate 700 may then use its private key to sign a Vendor Certificate 702 for purposes of verifying the identity of the vendor of the software running on the manager 104. The Vendor Certificate 702 may then use its private key to sign a Product Certificate 704 for each piece of distinct software running on the manager 104. The Product Certificate 704 may then be used for purposes of verifying the integrity of the software associated with the certificate.

Each Product Certificate 704 includes the public key from the Vendor Certificate 702 and is signed using the corresponding private key of the Vendor Certificate 702. In particular, when a new release of software is ready for distribution, a Product Certificate 704 is produced by hashing the software's binary file and obtaining a hash value using the SHA-1 algorithm. This hash value, along with the software release information, is embedded in the Product Certificate 704. Examples of the data fields used in the Product Certificate for the manager 104 software application are shown in Table 4.

TABLE 4

| Fields | Data |
| --- | --- |
| Serial Number | 678BEC1E-11BCE45D-034EC3A8-CC678123 |
| Common Name | ECM ® Product Certificate |
| Description | Product: ctManager |
| Description | Vendor: CoreTrace |
| Description | Product Version: XDTEAL-9-1-12 |
| Description | Date: 20040227000000OZ |
| Description | SHA1: e9a6b7dfb77170f03160404371f8ed5f952713f4 |

The Serial Number field again contains the UUID for just this software release; the Common Name shows this certificate is a product certificate; and the Description fields are expanded to show the unique parameters for this software release. A key field in this certificate is the hash value, which ideally remains the same for all releases of the software. As such, the various software in the system are developed in a controlled manner such that a source file compiled in the future should have an identical binary file to one that was compiled previously. This kind of software control is needed to produce a unique hash value that is repeatable for each piece of software. Once completed, the Product Certificate 704 may be used to test and verify the integrity of the software associated with the certificate.

Embodiments of the invention provide two distinct aspects to testing software integrity. The first test determines whether the binary file on the disk is a legitimate, non-compromised system application. The second test determines whether the image of the software running on the manager 104 is the same as the file stored on the manager 104. During assembly of the manager 104, the manager 104 software application binary file and its affiliated Product Certificate 704 are loaded onto the solid-state memory of the manager 104 (or a hard drive in some cases). Then, as part of the startup process, and at certain intervals while the manager 104 software application is running, the certificate handling subroutines of the manager 104 software performs an integrity test. In one implementation, the manager 104 uses the public key from the Vendor Certificate 702 to verify the digital signature on the Product Certificate 704. The certificate itself is then hashed and the hash value checked to ensure it has not been compromised. Because the image of the manager 104 software application in memory is doing the testing, the integrity of that image first needs to be tested. Accordingly, the image in memory is also hashed, the binary file stored in the solid-state memory (or hard disk) is hashed, and the two hash values are compared. If the hash values match, it may be assumed that the image in memory has not been corrupted from the original file. If there is no match, the manager 104 is designed to cease operations immediately. Assuming the hash values match, they are next compared to the hash value from the Description field SHA1 in the Product Certificate 704. If these two match, then it may be assumed that the binary file has not been modified from its original form, either in memory or as stored.

Figure 7B:
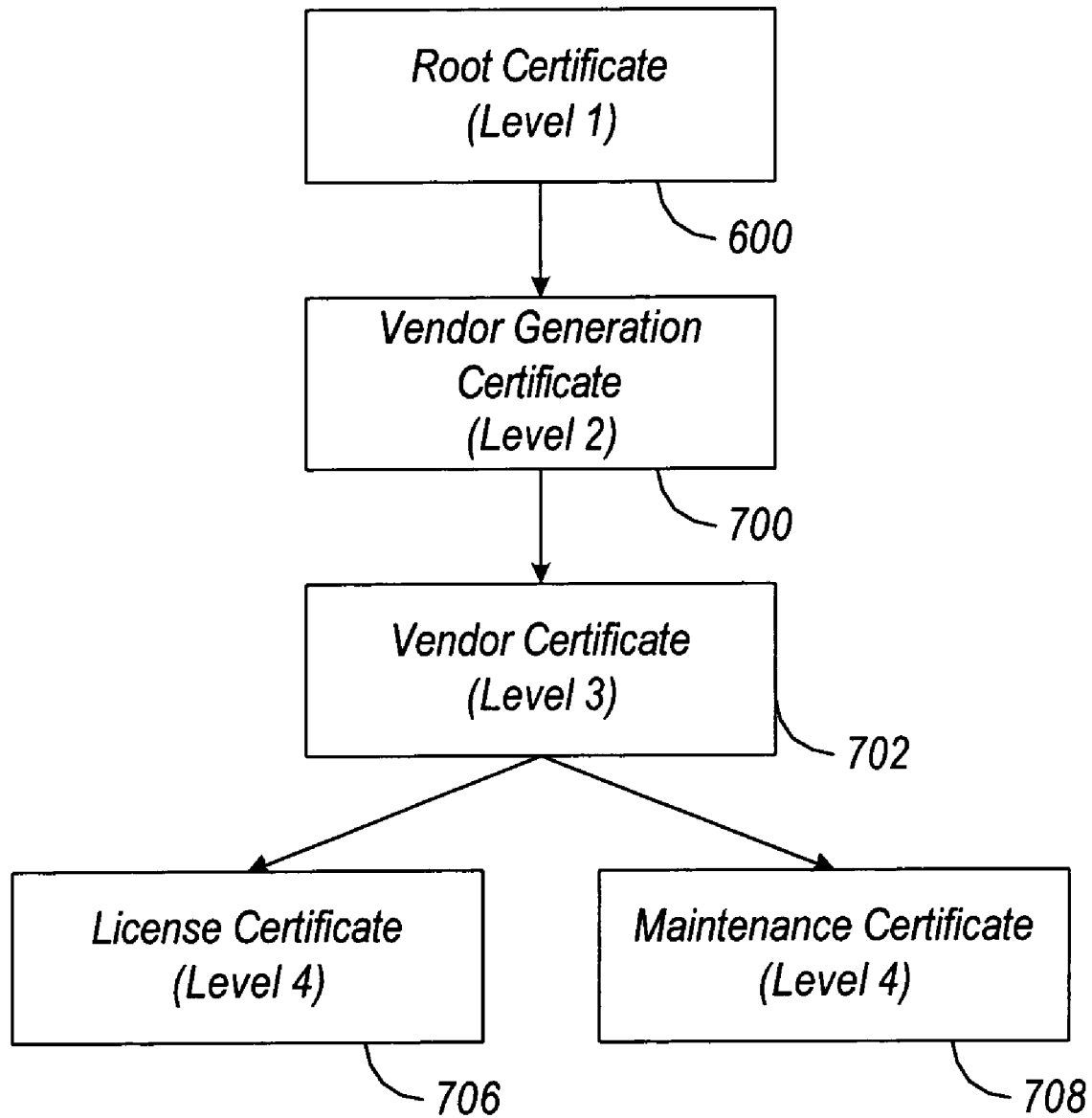

In addition to the Product Certificate 704 for each piece of software, there may also be a License Certificate 706 and a Maintenance Certificate 708, as illustrated in FIG. 7B. The License Certificate 706 is used to determine whether the user has obtained the right to run the software and the Maintenance Certificate 708 is used to determine whether the user has obtained the right to upgrade the software. Like the Product Certificate 704, the License Certificate 706 and the Maintenance Certificate 708 are signed by the level 3 private key of the Vendor Certificate 702 (e.g., during manufacture) used for vendor identification.

Turning now to the License Certificate 706, the certificate is used to authorize the use of specific software on a specific computing platform. Table 5 shows examples of the data fields used in the License Certificate 706 for a manager 104 software application.

TABLE 5

| Fields | Data |
| --- | --- |
| Serial Number | A47FA35E-53E696D7-09C9F455-10694156 |
| Common Name | ECM ® License Certificate |
| Description | Product: ctManager |
| Description | Vendor: CoreTrace |
| Description | Platform Type: Manager |
| Description | License Count: 1 |
| Description | License Serial No.: 2CFB97EA-DD2C6486-BE8B577A-5D4DE791 |
| Description | License Pack: False |
| Description | License Pack Serial Number: |

As can be seen, this certificate is somewhat different than previously described certificates in that the Serial Number field is not the UUID for this certificate. Instead, the Serial Number field contains the UUID of the computing platform, namely, the manager 104, on which this software is allowed to run. It is the License Serial Number field that contains the unique UUID for the License Certificate 706. The remaining fields show that this certificate is for a manager 104 software application and that one copy is licensed to run.

The License Certificate 706 is then used as part of another self-test following the integrity checks (using the Product Certificate 704 described earlier). First, the integrity of the License Certificate 706 is determined using the public key from the Vendor Certificate 702. Next, the platform UUID from the Manager Certificate 604 (see FIG. 6) is compared to the platform UUID in the License Certificate 706. If the two UUIDs match, then it can be assumed that the software is authorized to run on this manager 104. Finally, the product name and the vendor name are compared to those in the Product Certificate 704 to ensure that the correct product is running.

Figure 7C:
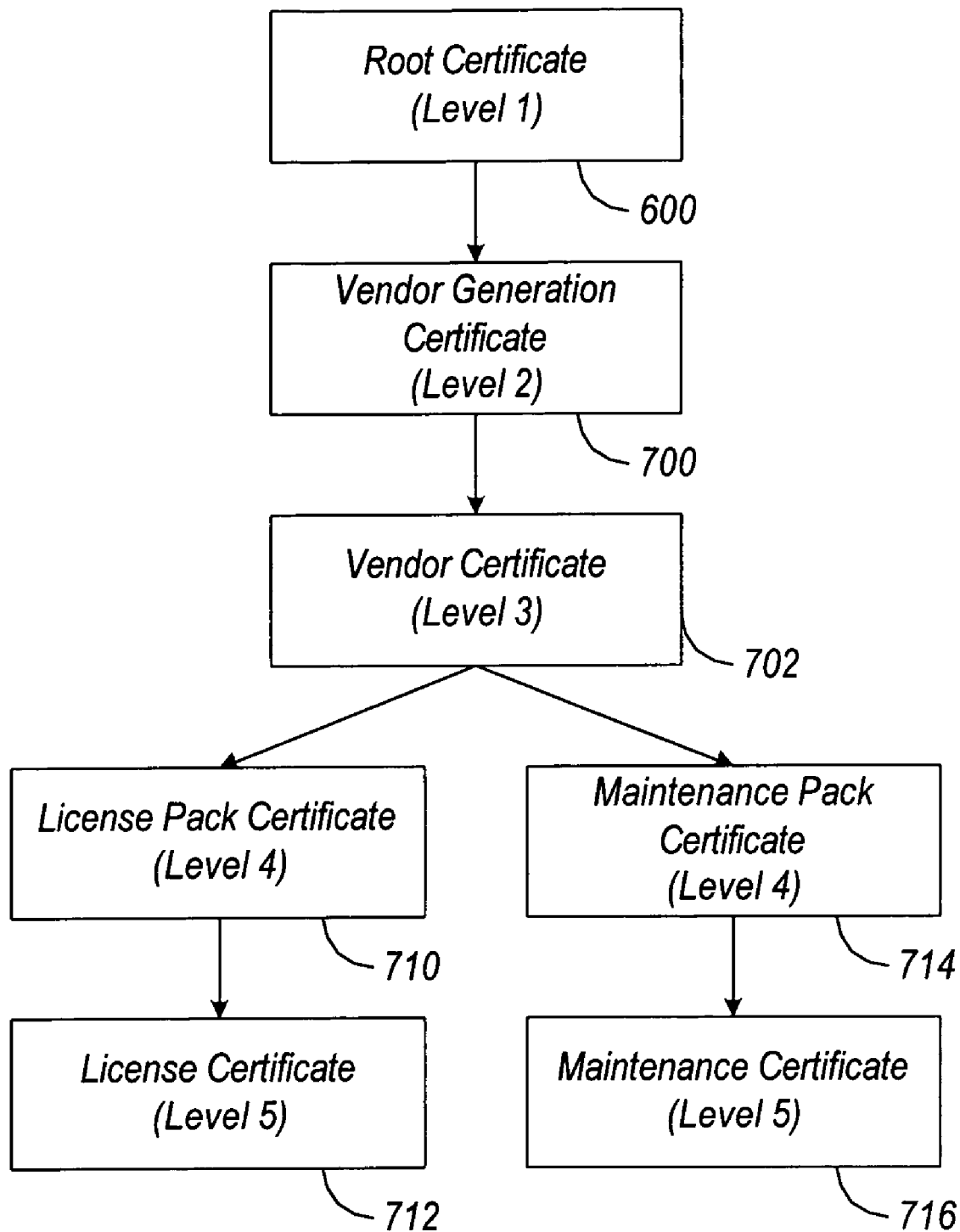

There may be multiple licenses stored on the manager 104. For example, in addition to the license for the manager 104 software application itself, the manager 104 may contain licenses for all of the clients 108 managed via the manager 104. Thus, embodiments of the invention also provide License Pack Certificates 710 instead or in addition to the License Certificate 706, as illustrated in FIG. 7C. The License Pack Certificate 710 contain data fields that allow the manager 104 to install and issue multiple copies of the client 108 software, which may be sold in license packs with specific numbers of copies (e.g., 50, 100, 250, 500, etc.). A License Pack Certificate 710 for these license packs may be pre-installed (e.g., at the time of manufacturer) or the customer can purchase additional license packs as needed. Examples of the data fields used in a License Pack Certificate 710 in Table 6.

TABLE 6

| Fields | Data |
| --- | --- |
| Serial Number | A47FA35E-53E696D7-09C9F455-10694156 |
| Common Name | ECM ® Product License |
| Description | Product: ctClient |
| Description | Vendor: CoreTrace |
| Description | Platform Type: Desktop |
| Description | License Count: 50 |
| Description | License Serial No.: 2CFB97EA-DD2C6486-BE8B577A-5D4DE791 |
| Description | License Pack: True |
| Description | License Pack Serial No.: 2CFB97EA-DD2C6486-BE8B577A-5D4DE791 |

Note that the Serial Number field in Table 6 contains the same UUID as in the previous example, indicating that this license pack can only be used on the same manager 104 as before. The particular License Pack Certificate 710 shown here allows the manager 104 to install 50 copies of the desktop version of the client 108 software application. Note also that the License Pack Serial Number field in Table 6 contains the same UUID as the License Serial Number. This License Serial Number is subsequently included in a level 5 License Certificate 712 generated by the manager 104 when it installs each copy of the client 108 software. The main difference between the level 5 License Certificate 712 and level 4 License Certificate 706 of FIG. 7B (and the corresponding Maintenance Certificates) is that the level 4 versions are used for the software of the manager 104 and the console 106, whereas the level 5 versions are used for the client 108.

For each copy of the client 108 software application, the manager 104 generates a level 5 License Certificate 712 to go with that copy of the client 108 software application. The License Certificate 712 is similar to the Client Certificate 610 discussed previously (see FIG. 6) except that this certificate is signed by the private key from the License Pack Certificate 710 instead of the private key from the Manager Certificate 604. The License Certificate 712 may then be transferred to the target end-user platform 102 (along with the level 1-4 License certificates), then used for controlling the client 108 software from the manager 104. Note that the level 1-4

License Certificates must be authenticated in order to make any change to the licensing of the client 108 software. Examples of the data fields used in the License Certificate 712 are shown in Table 7.

TABLE 7

| Fields | Data |
|---|---|
| Serial Number | BCB45690-5C47B890-DF436713-BDB5F5B6 |
| Common Name | ECM ® Product License |
| Description | Product: ctClient |
| Description | Vendor: CoreTrace |
| Description | Platform Type: Server |
| Description | License Count: 1 |
| Description | License Serial Number: 8785C432-67BCD241-777FDE45-45E32178 |
| Description | License Pack: False |
| Description | License Pack Serial No: 2CFB97EA-DD2C6486-BE8B577A-5D4DE791 |

For the most part, this certificate is similar to the License Certificate 706 (see FIG. 7B) described earlier for licensing the manager 104 software application. Note, however, that the License Pack Serial Number field is filled in with data linking this certificate back to the License Pack Certificate 710 from which it came from. The Serial Number field contains the UUID for the target end-user platform 102 and the License Serial Number field contains the unique UUID for the License Certificate 712 itself.

As for the Maintenance Certificate 708, referring back to FIG. 7B, each software License Certificate 706 is preferably accompanied by one or more Maintenance Certificates 708. These certificates are issued when the users buy their initial or continuing software maintenance support and are consulted by the manager 104 to determine if the user is eligible to upgrade his/her software. Examples of the data fields used in the Maintenance Certificate for a typical client 108 software application are shown in Table 8.

TABLE 8

| Fields | Data |
|---|---|
| Serial Number | BCB45690-5C47B890-DF436713-BDB5F5B6 |
| Common Name | ECM ® Maintenance License |
| Description | Product: ctClient |
| Description | Vendor: CoreTrace |
| Description | License Serial No.: 8785C432-67BCD241-777FDE45-45E32178 |
| Description | Valid Start: 20040101000000Z |
| Description | Valid End: 20041231235959Z |

The Serial Number field in Table 8 reflects the UUID of the target computing platform, namely, the end-user platform 102. The License Serial Number corresponds to the License Certificate for the client 108 software application in the previous example. The most important data fields in this certificate are the Valid Start and Valid End dates of the maintenance period. The user is allowed to download the latest software (e.g., the latest manager 104 software application) via the manager 104 at any time during this period. Outside this period, the user may still be able to download latest software, but the manager 104 will only execute the previous version (based on the date in the product version field of the Product Certificate 704 of the software) and not the new version.

A Maintenance Pack Certificate 714 corresponding to the License Pack Certificate 710 is also available for downloading multiple updates of the client 108 software application. The manager 104 consults the Maintenance Pack Certificates 714 to see which target end-user platform's client 108 software application is eligible for upgrade. Each download of the latest version of the client 108 software application will be stored along with the previous version on the manager 104. At the time of the download, a corresponding Product Certificate 704 (see FIG. 7A) is provided to ensure the integrity and authenticity of the client 108 software application in the manner mentioned earlier. It is possible some client 108 software application may have had their maintenance renewed and others have not. The manager 104 will check to see if the product release date from the Product Certificate 704 is in the Valid Start to Valid End window provided by Maintenance Pack Certificate 712. If it is, then the user has a valid maintenance contract and the manager 104 will allow the enterprise administrator to upgrade the eligible client 108 software applications. If so, each approved client 108 will receive upgraded software.

The foregoing License certificates are used to assemble a keychain of public keys similar to the Platform certificates (FIG. 6). These keys, in turn, are used for authentication of the next higher level certificates. The system 100 uses the level 2 private key associated with the Vendor Generation Certificate to sign the level 3 the Vendor Certificate. This certificate along with its private key may then be produced for third-party developers interested in developing software for operating over the system 100. The third-party developers may then produce their own level 4 certificates for their specific products. The system 100 will recognize these certificates and enforce the appropriate licensing and maintenance policies. This scheme is already in effect for control of the software running the various components of the system 100 and provides many added benefits for third-party developers.

Figure 8:
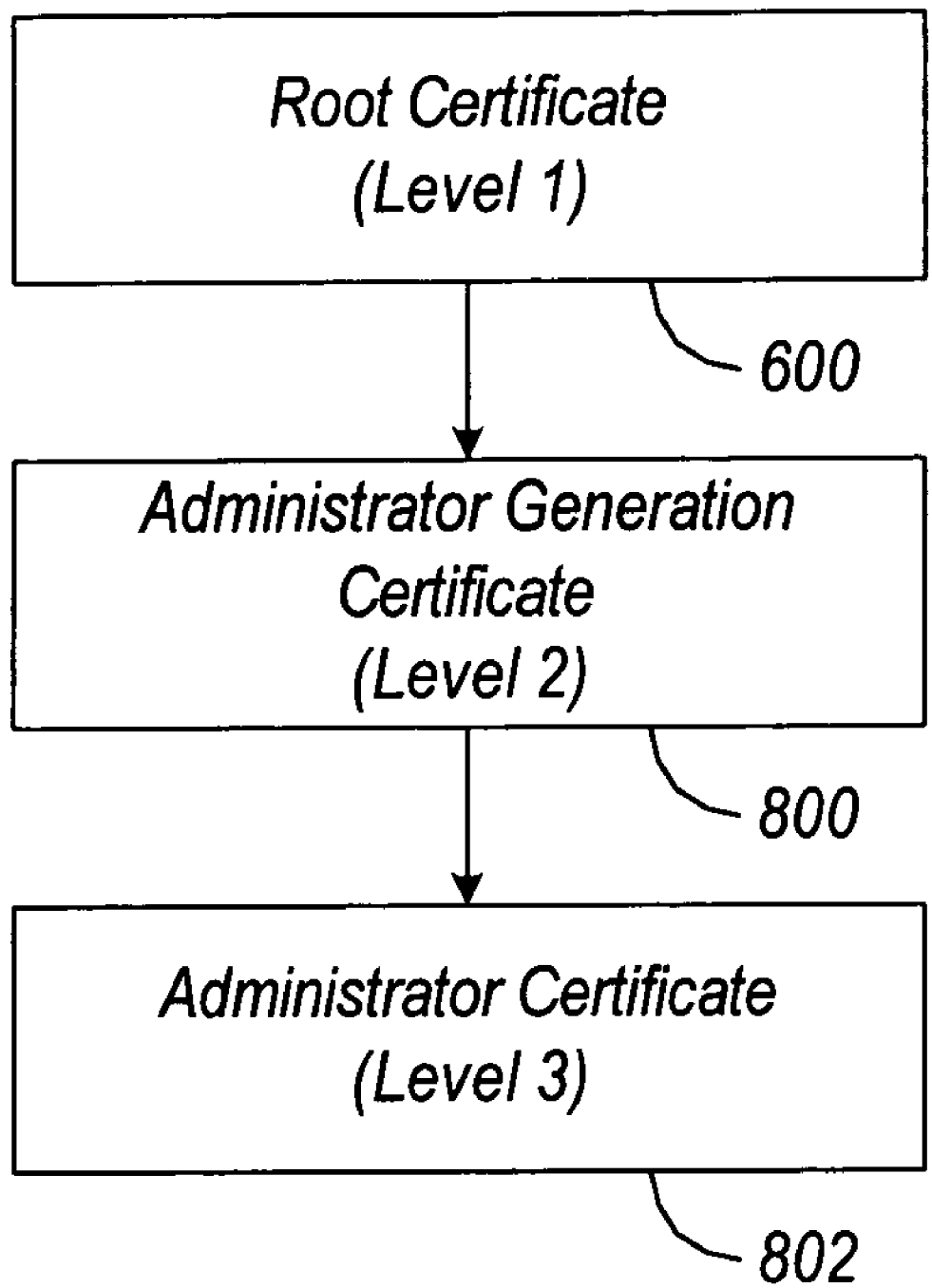
FIG. 8 illustrates an exemplary hierarchy for an administrator certificates group according to embodiments of the invention.

The final certificates that are discussed are the Root Certificate, the Administrator Generation Certificate, and the Administrator Certificate, the hierarchy for which is shown in FIG. 8. These keys are unique in both their creation and use in the system 100. The private key affiliated with the Root Certificate 600 is used to sign all level 2 certificates in the keychain and the corresponding public key, which is contained in the Root Certificate 600 itself, is used to authenticate all level 2 certificates. The private key associated with the Administrator Generation Certificate 800 is used to sign the Administrator Certificate 802 and the corresponding public key, which is contained in the Administrator Generation Certificate itself, is used to authenticate the Administrator Certificate 802. The Administrator Certificate 802 is used to identify various individuals to the system 100 and manage their level of access to system resources via the e-token mentioned previously.

With the above closed public-key infrastructure, there is no need for a separate Certificate Authority to issue and sign digital certificates. That is, the Root Certificate 600 may be self-signed using its own private key. To maintain the integrity of the entire system 100, two-person control of Root Certificate private key should be maintained at all times. In addition, the Root Certificate private key should be loaded only as needed, and only onto a single, non-networked computer to generate and sign additional digital certificates. When not needed, this Root Certificate private key should be maintained under physical lock and key in a secure vault.

As alluded to previously, embodiments of the invention use a two-part authentication scheme that includes an e-token (not expressly shown) that may be plugged into the console 106 and in some cases a 32-character passphrase provided by the administrator. The e-token is designed to produce an RSA key pair from its on-board hardware and can also store certain electronic information in its on-board solid state memory. In addition, the e-token is designed to the very secure in that the private key cannot be extracted from the hardware except as used for authentication. This security allows the e-token to be used to generate additional Administrator Certificates 802 as needed, as explained below.

Generation of the Administrator Certificate 802 is performed by the manufacturer of the managers 104, preferably at the same time the managers 104 are assembled. Information collected from the manager 104 is then embedded in the Administrator Certificate 802. Examples of the data fields used in the Administrator Certificate 802 are shown in Table 9.

TABLE 9

| Fields | Data |
|---|---|
| Serial Number | 542899F1-DAC43218-A1A1A1B2-986FC345 |
| Common Name | ECM ® Admin |
| Description | Platform ID: A47FA35E-53E696D7-09C9F455-10694156 |
| Description | Platform P/N: ECM-3000-WO1 |
| Description | Mac0: 08:00:20:1d:7d:83 |
| Description | Mac1: 00:02:b3:c3:66:d0 |

The Serial Number data field in the above table contains a UUID for this certificate and, as will be seen shortly, uniquely identifies this administrator during login. The Platform ID data field contains the UUID of the manager 104 and the Mac0 and Mac1 data fields contain the MAC addresses of the two network interface cards on this particular manager 104. The Administrator Certificate 802 is different in form from the other certificates described thus far in that the embedded public key is that of the e-token and the certificate is signed by the private key affiliated with the Administrator Generation Certificate 800. Once the Administrator Certificate 800 to is assembled by the manufacturer, it is written to the memory of the e-token.

To log in, the administrator inserts the e-token into the console 106 to begin the login process. The console 106 extracts the Administrator Certificate 802 from the e-token and uses the public key from the Administrator Generator Certificate 800 to verify the extracted information. Then, using the MAC address information, or information cached on the electronic token, or user supplied information, the console 106 sets up an encrypted link to the appropriate manager 104 and sends the Administrator Certificate 802 to the manager 104. The console 106 then prompts the administrator for a passphrase, performs a hash of the phrase, encrypts it with the private key from the e-token, and transmits it to the manager 104.

The manager 104 first verifies the information in the Administrator Certificate and extracts the public key of the e-token. When the console 106 sends the encrypted hash of the passphrase, the manager 104 uses the public key of the e-token to decrypt it and then compares the hash value with the value that the administrator last used to login. If the two match, the administrator has passed the two-part login, and the manager 104 provides him/her with administrative access to the system 100.

The foregoing digital certificates are used extensively for infrastructure, licensing, and administrative management of the system 100. The following table, Table 10, provides a quick summary of the primary use of the public key, private key, and data fields for each certificate. This table is not intended to be a comprehensive list, but simple reflect the above discussion.

TABLE 10

| Certificate | Primary Uses |
|---|---|
| MANAGER | |
| Root Certificate | Public Key - Authenticate the Appliance Generation Certificate, the Vendor Generation Certificate, the Administrator Generation Certificate, Software Checks |
| Appliance Generation Certificate | Public Key - Authenticate the Manager Certificate, the Console Certificate, the Install Certificate |
| Manager Certificate | Public Key - Authenticate the Client Certificate<br>Data Fields - Identify Specific Manager<br>Private Key - Client Certificate |
| Vendor Generation Certificate | Public Key - Authenticate the Vendor Certificate |
| Vendor Certificate | Public Key - Authenticate the Product Certificate, License Certificate, and Maintenance Certificate |
| Product Certificate | Data Fields - Identify Specific Software Release |
| License Certificate | Data Fields - Identify Specific Licensed Software |
| Maintenance Certificate | Data Fields - Identify Specific Maintenance Period |
| Administrator Certificate | Public Key - Authenticate Electronic Token<br>Data Fields - Identify Specific Administrator |
| CONSOLE | |
| Root Certificate | Public Key - Authenticate the Appliance Generation Certificate, the Vendor Generation Certificate, the Administrator Generation Certificate, Software Checks |
| Appliance Generation Certificate | Public Key - Authenticate the Manager Certificate, the Console Certificate |
| Console Certificate | Data Fields - Identify Specific Console |
| Vendor Generation Certificate | Public Key - Authenticate the Vendor Certificate |
| Vendor Certificate | Public Key - Authenticate the Product Certificate, License Certificate, and Maintenance Certificate |
| Product Certificate | Data Fields - Identify Specific Software Release |

TABLE 10-continued

| Certificate | Primary Uses |
| --- | --- |
| License Certificate | Data Fields - Identify Specific Licensed Software |
| Maintenance Certificate | Data Fields - Identify Specific Maintenance Period |
| PLATFORM | |
| Root Certificate | Public Key - Authenticate the Appliance Generation Certificate, the Vendor Generation Certificate, the Administrator Generation Certificate, Software Checks |
| Appliance Generation Certificate | Public Key - Authenticate the Manager Certificate |
| Manager Certificate | Public Key - Authenticate the Client Certificate |
| Client Certificate | Data Fields - Identify Specific Client |
| Vendor Generation Certificate | Public Key - Authenticate the Vendor Certificate |
| Vendor Certificate | Public Key - Authenticate the Product Certificate, License Certificate, and Maintenance Certificate |
| Product Certificate | Data Fields - Identify Specific Software Release |
| License Certificate | Data Fields - Identify Specific Licensed Software |
| Maintenance Certificate | Data Fields - Identify Specific Maintenance Period |

One additional use for the digital certificates in the system 100 is to ensure all system components come up in the intended secure fashion when power fails, systems intentionally reboot, or when they are started for the first time. The various system software applications are designed to minimize the possibility of system compromise and licensing theft. Specifically, once a system software application is installed on a computing platform, it will only run on that particular hardware platform. On startup, the manager 104 software will first go to its certificate file and read the Root Certificate 600. The certificate handling routine of the manager 104 software sees the certificate is self-signed and will directly extract the public key from the certificate. The manager 104 software then uses this key to decrypt the signatures on both the Appliance Generation Certificate 602 and the Vendor Generation Certificate 700, obtain their hash values, and compare those values against the hash values it calculated from the two certificates 602 and 700. In addition, the manager 104 software will check the data fields included within the certificate. This is done to verify the integrity and authenticity of the public keys that are extracted from these two certificates 602 and 700.

Assuming the certificates are correct, the manager 104 software uses the public key of the Appliance Generation Certificate 602 to decrypt the signatures of the Manager Certificate 604, and obtain its hash value. Assuming the hash value matches the expected value, the manager 104 software loads the public key from this certificate into memory with the previous three keys and then perform its last integrity check. It will check the local system for Windows SID, Windows OS build, and Pentium CPU serial number. These values will be compared to those in the Manager Certificate. If they match, the application is running on the proper platform and has not been copied.

If at any time during this startup process a security test or check does not pass, the manager 104 software is designed to cease operating and, in a preferred embodiment, must be returned to the manufacturer for a replacement (and an investigation into the security breach).

While the invention has been described with respect to a number of specific embodiments, those skilled in the art will recognize that the innovative concepts described herein can be modified and varied over a wide range of applications. For example, while the license management features herein have been discussed primarily with respect to software applications, the invention may be equally applicable to any type of electronic data, including application files (e.g., drivers, libraries, etc.), digital audio files, digital image files, digital video files, digital data files, and the like, whether executable or otherwise. Moreover, although the invention has been described primarily with respect to digital certificates, any type of digital authentication information, in any suitable format, may be used without departing from the scope of the invention. Accordingly, the scope of the invention should not be limited to any of the specific exemplary teachings discussed, but is instead defined by the following claims.

What is claimed is:

1. A method of establishing a secure environment for an end-user platform and a system manager usable to manage said end-user platform, comprising:
    storing a manager certificate on said system manager, said manager certificate unique to said system manager;
    generating a client certificate on said system manager for said end-user platform, said client certificate unique to said end-user platform and digitally signed via a private key unique to said manager certificate;
    transferring said client certificate from said system manager to said end-user platform;
    establishing a secure connection between said system manager and said end-user platform using said manager certificate and said client certificate;
    storing a vendor generation certificate on said system manager;
    storing a vendor certificate, said vendor certificate unique to a software vendor and digitally signed via a private key unique to said vendor generation certificate;
    generating a license certificate on said system manager, said license certificate unique to an authorization of use of a software of the software vendor on a specifically-identified appliance, said license certificate digitally signed via a private key unique to said vendor certificate, said software stored on said system manager;
    wherein said specifically-identified appliance is at least one of said system manager and said end-user platform;
    performing an integrity check of the software via a product certificate digitally signed by a private key unique to the vendor certificate;

verifying that the software is licensed for use on said at least one of said system manager and said end-user platform, the verification comprising comparing said license certificate to at least one of said manager certificate and said client certificate; and wherein the system manager is resident on one or more computers having at least a processor and memory, the steps of the method being performed by the one or more computers.

2. The method according to claim 1, further comprising loading an installation certificate on said end-user platform for allowing said system manager to verify that said end-user platform has been designated to be managed from said system manager.

3. The method according to claim 2, wherein said manager certificate and said installation certificate are derived from a common source of authentication information.

4. The method according to claim 1, further comprising storing a console certificate on a console usable to access said system manager, said console certificate unique to said console for allowing said system manager to authenticate said console.

5. The method according to claim 4, further comprising allowing said console to authenticate said system manager using said manager certificate.

6. The method according to claim 1, further comprising storing on said system manager said product certificate, said performance of an integrity check comprising allowing said system manager to verify that said software stored on said system manager is not corrupted.

7. The method according to claim 6, wherein said performance of an integrity check comprises allowing said system manager to verify that said software running in a memory of said system manager is not corrupted.

8. The method according to claim 1, further comprising wherein said license certificate comprises a manager license certificate and said at least one of said system manager and said end-user platform comprises said system manager.

9. The method according to claim 8, wherein said software includes one or more of the following: application files, data files, audio files, image files, video files.

10. The method according to claim 1, further comprising:
wherein said license certificate includes information specifying one or more software to be managed by said system manager;
transferring said license certificate to said computing platform; and
wherein said at least one of said system manager and said end-user platform comprises said end-user platform.

11. The method according to claim 1, further comprising storing a manager maintenance certificate on said system manager, said manager maintenance certificate digitally signed via a private key unique to said vendor certificate, said manager maintenance certificate uniquely identifying said software and allowing said system manager to verify that said software is authorized for maintenance on said system manager.

12. The method according to claim 11, wherein said manager maintenance certificate includes information specifying one or more software authorized to be maintained via said system manager, further comprising generating an end-user platform maintenance certificate for said one or more software authorized to be maintained and transferring said end-user platform maintenance certificate to said end-user platform.

13. A system for managing a plurality of computing platforms, comprising:

a network connecting a plurality of end-user platforms to each other;

one or more appliances connected to said network and having appliance authentication information stored thereon that is unique to each appliance, said appliance authentication information for said one or more appliances derived from a single source of authentication information such that any appliance is capable of authenticating any other appliance; and wherein said one or more appliances include a manager appliance for managing said computing platforms, said manager appliance having a processor and memory, said manager appliance being configured to:
store a manager certificate on said manager appliance, said manager certificate unique to said manager appliance;
generate a client certificate for at least one end-user platform in said plurality of end-user platforms, said client certificate unique to said at least one end-user platform and digitally signed via a private key unique to said manager certificate;
transfer said client certificate from said manager appliance to said at least one end-user platform;
establish a secure connection between said manager appliance and said at least one end-user platform using said manager certificate and said client certificate;
store a vendor generation certificate on said manager appliance;
store a vendor certificate, said vendor certificate unique to a software vendor and digitally signed via a private key unique to said vendor generation certificate;
generate a license certificate, said license certificate unique to an authorization of use of a software of the software vendor on a specifically-identified appliance, said license certificate digitally signed via a private key unique to said vendor certificate, said software stored on said manager appliance;
wherein said specifically-identified appliance is at least one of said manager appliance and said at least one end-user platform;
perform an integrity check of the software via a product certificate digitally signed by a private key unique to the vendor certificate; and
verify that the software is licensed for use on said at least one of said manager appliance and said at least one end-user platform, the verification comprising comparing said license certificate to at least one of said manager certificate and said client certificate.

14. The system according to claim 13, wherein said one or more appliances include a console appliance for accessing said manager appliance.

15. The system according to claim 13, wherein a single source of authentication information is a manufacturer of said one or more appliances.

16. The system according to claim 15, wherein said manufacturer is configured to self-authenticate any authentication information provided to said one or more appliances.

17. A license-verification method, the license-verification method comprising:
on a system manager, storing a hierarchy of license-related certificates, the hierarchy of license-related certificates comprising:
a root certificate;
a manager certificate, said manager certificate unique to said system manager;

a client certificate used for at least one end-user platform in a plurality of end-user platforms, said client certificate unique to said at least one end-user platform and digitally signed via a private key unique to said manager certificate, and wherein said client certificate is transferred from said system manager to said at least one end-user platform;

a vendor-generation certificate;

a vendor certificate identifying a specific software vendor, the vendor certificate digitally signed via a private key unique to the vendor-generation certificate;

a product certificate identifying a specific software product of the software vendor stored on the system manager, the product certificate digitally signed via a private key unique to the vendor certificate;

a license pack certificate that identifies a plurality of licensed uses of the specific software product being managed by the system manager, the license pack certificate digitally signed via a private key unique to the vendor certificate; and a plurality of license certificates corresponding to the plurality of licensed uses, each license certificate in the plurality of license certificates digitally signed via a private key unique to the license pack certificate;

establishing a secure connection between a manager appliance and the at least one end-user platform;

via the product certificate, authenticating the software product stored on the system manager;

via at least one license certificate of the plurality of license certificates, verifying that the software product is licensed for use on the at least one end-user platform by comparing said license certificate to at least one of said manager certificate and said client certificate; and wherein the system manager is resident on one or more computers having at least a processor and memory, the storing, establishing, authenticating and verifying actions being performed by the one or more computers.

18. The method of claim 17, the method comprising:
wherein the client certificate is dynamically generated for said at least one end-user platform; and
wherein the establishment of the secure connection is accomplished via the manager certificate and the client certificate.

19. The method of claim 18, the method comprising:
wherein the product certificate comprises a hash value of a binary file of the software product; and
the authentication of the software product stored on the system manager comprises comparing the hash value of the binary file with a hash value of the software product stored on the system manager.

20. The method of claim 19, wherein the verification that the software product is licensed for use on the at least one end-user platform comprises comparing an identification of the at least one end-user platform in the client certificate with an identification of a licensed end-user platform in the at least one license certificate.

21. The method of claim 19, the method comprising, responsive to successful completion of the verification that the software product is licensed for use on the at least one end-user platform:
transferring the at least one license certificate to the at least one end-user platform; and
installing, from the system manager, the software product on the at least one end-user platform.

22. The method according to claim 18, wherein the authentication of the software product stored on the system manager comprises verifying that the software product is not corrupted.

23. The method according to claim 18, the method comprising:
using the vendor certificate to generate a maintenance pack certificate, the maintenance pack certificate unique to the software product, the maintenance pack certificate identifying a plurality of licensed upgrades to the software product; and
for each of the plurality upgrades, generating a maintenance certificate, the maintenance certificate digitally signed via a private key unique to the license pack certificate; and
via the maintenance certificate, verifying that the at least one end-user platform is licensed to receive upgrades to the software product.

24. The method of claim 23, wherein the verification that the at least one end-user platform is licensed to receive upgrades to the software product comprises comparing an identification of the at least one end-user platform in the client certificate with an identification of a licensed end-user platform in the maintenance certificate.

25. The method of claim 23, the method comprising, responsive to successful completion of the action of verifying that the at least one end-user platform is licensed to receive upgrades to the software product:
transferring the maintenance certificate to the at least one end-user platform; and
authorizing an upgrade to the software product on the at least one end-user platform.

26. The method of claim 18, the method comprising verifying authenticity of the license pack certificate by determining, via a public key of the vendor certificate, whether the private key utilized in digitally signing the license pack certificate is authentic.

* * * * *